(12) United States Patent
Cody et al.

(10) Patent No.: US 8,523,458 B2
(45) Date of Patent: Sep. 3, 2013

(54) FIBER OPTIC INTERFACE DEVICE WITH BENT OPTICAL PATH

(75) Inventors: Joseph Todd Cody, Hickory, NC (US); Micah Colen Isenhour, Lincolnton, NC (US); Dennis Michael Knecht, Hickory, NC (US); James Phillip Luther, Hickory, NC (US); Claudio Mazzali, Painted Post, NY (US)

(73) Assignee: Corning Incorporated, Corning, NY (US)

(*) Notice: Subject to any disclaimer, the term of this patent is extended or adjusted under 35 U.S.C. 154(b) by 236 days.

(21) Appl. No.: 13/049,935

(22) Filed: Mar. 17, 2011

(65) Prior Publication Data

US 2011/0229087 A1  Sep. 22, 2011

Related U.S. Application Data

(60) Provisional application No. 61/315,428, filed on Mar. 19, 2010.

(51) Int. Cl.
  *G02B 6/36*  (2006.01)
(52) U.S. Cl.
  USPC .......................................................... 385/79
(58) Field of Classification Search
  None
  See application file for complete search history.

(56) References Cited

U.S. PATENT DOCUMENTS

| | | | |
|---|---|---|---|
| 5,155,784 A | 10/1992 | Knott | |
| 5,263,111 A | 11/1993 | Nurse et al. | |
| 5,390,271 A * | 2/1995 | Priest | 385/92 |
| 5,418,875 A | 5/1995 | Nakano et al. | |
| 6,217,230 B1 | 4/2001 | Matsushita | |
| 6,419,399 B1 | 7/2002 | Loder et al. | |
| 6,457,875 B1 | 10/2002 | Kropp et al. | |
| 7,189,007 B2 * | 3/2007 | Imanbayev et al. | 385/77 |
| 7,197,221 B2 * | 3/2007 | Ohtsu et al. | 385/130 |
| 7,404,679 B2 * | 7/2008 | Ebbutt et al. | 385/78 |
| 7,670,063 B2 | 3/2010 | Ice | |
| 7,824,109 B2 | 11/2010 | Tanaka et al. | |
| 8,083,418 B2 * | 12/2011 | Fujiwara et al. | 385/92 |
| 8,277,129 B2 * | 10/2012 | Sabano et al. | 385/83 |
| 8,277,130 B2 * | 10/2012 | Nishimura et al. | 385/83 |
| 2001/0041030 A1 | 11/2001 | Chen et al. | |
| 2004/0197045 A1 | 10/2004 | Lappohn et al. | |
| 2004/0234210 A1 | 11/2004 | Nagasaka et al. | |
| 2005/0238294 A1 | 10/2005 | Nagasaka et al. | |
| 2006/0177183 A1 * | 8/2006 | Imanbayev et al. | 385/89 |
| 2008/0226228 A1 | 9/2008 | Tamura et al. | |

(Continued)

FOREIGN PATENT DOCUMENTS

| | | |
|---|---|---|
| AU | B-72832/91 | 9/1991 |
| DE | 4008483 | 9/1991 |
| EP | 1199587 | 4/2002 |
| WO | 85/00899 | 2/1985 |
| WO | 2006/088859 | 8/2006 |

*Primary Examiner* — Sung Pak
(74) *Attorney, Agent, or Firm* — Svetlana Z. Short

(57) ABSTRACT

A fiber optic interface device with a bent optical path has a ferrule with a body having front and rear ends and an internal cavity adjacent the front end and defined by a rear wall and a bottom wall. The bottom wall defines at least one lens. The device includes at least one optical waveguide that defines the bent optical path. The ferrule supports at least one optical waveguide so that the bent optical path resides within the cavity, with the fiber end being operably aligned with the at least one lens. A fiber optic interface assembly is formed by mating the device with a second fiber optic interface device.

24 Claims, 26 Drawing Sheets

(56) References Cited

U.S. PATENT DOCUMENTS

| | | |
|---|---|---|
| 2009/0182911 A1 | 7/2009 | Krasner et al. |
| 2009/0297099 A1 | 12/2009 | Benjamin et al. |
| 2010/0021112 A1 | 1/2010 | Moriarty et al. |
| 2011/0229088 A1* | 9/2011 | Isenhour et al. ............... 385/78 |
| 2012/0099822 A1 | 4/2012 | Kuffel et al. |

* cited by examiner

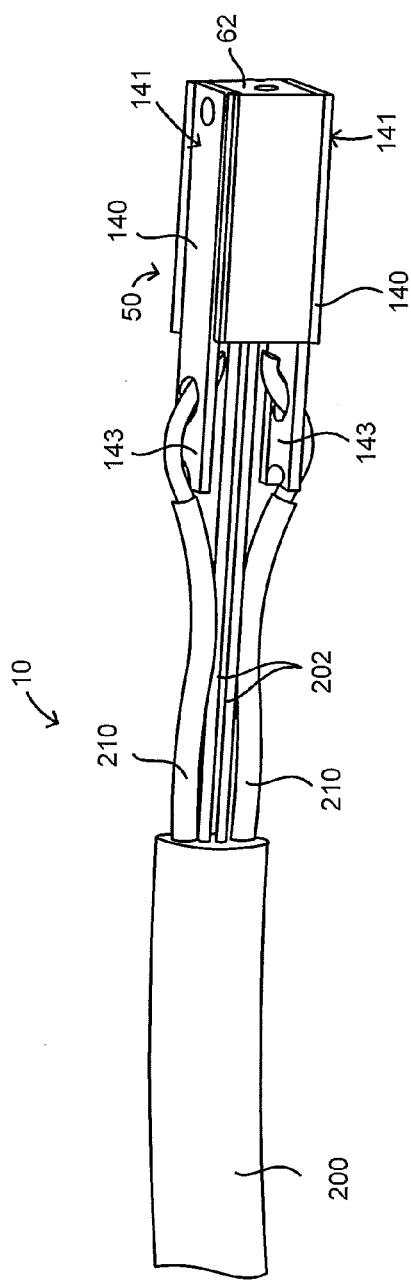
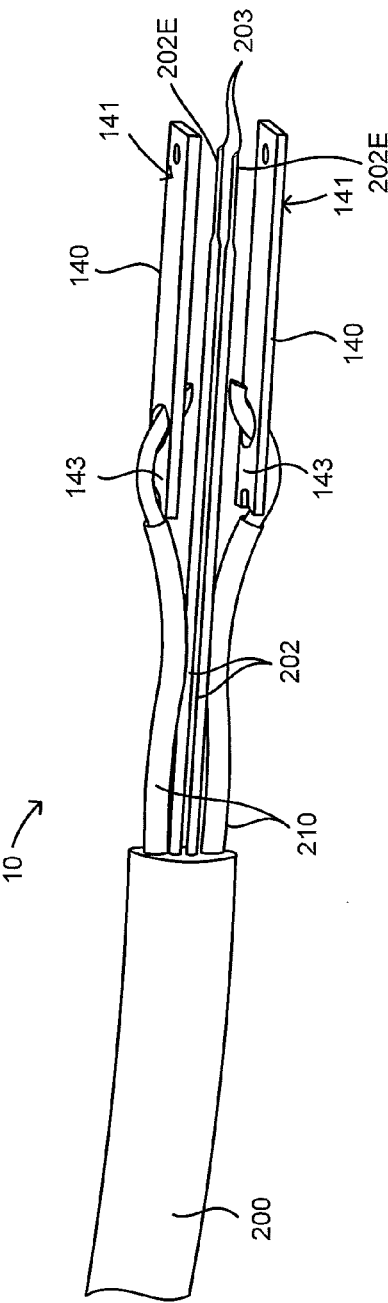
FIG. 3A
FIG. 3B

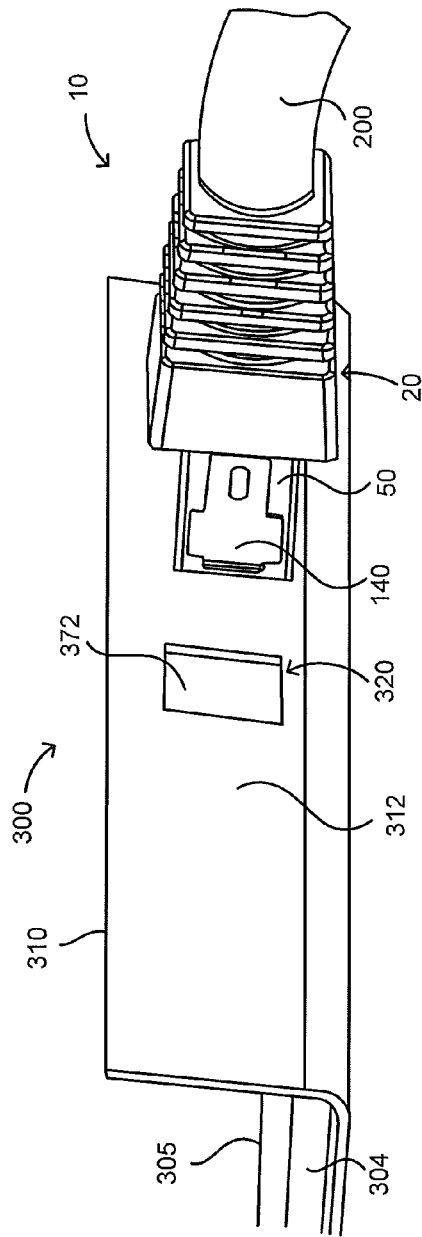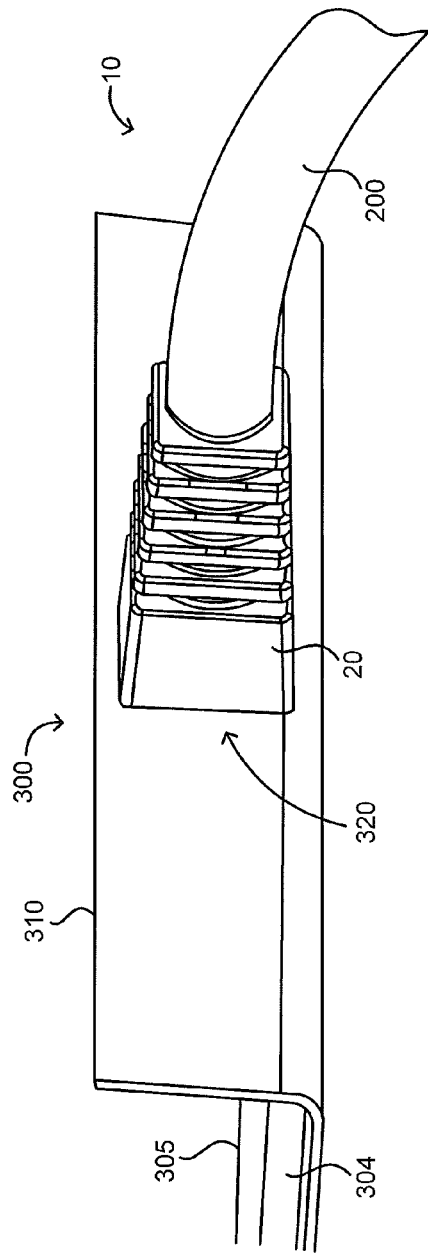
FIG. 7A
FIG. 7B

FIBER OPTIC INTERFACE DEVICE WITH BENT OPTICAL PATH

CLAIM OF PRIORITY

This application claims the benefit of priority under 35 U.S.C. §119(e) of U.S. Provisional Application Ser. No. 61/315,428, filed on Mar. 19, 2010, and which application is incorporated by reference herein.

FIELD

The disclosure is directed to optical interface devices, and in particular to such devices having a bent optical path, including fiber optic interface devices with complementary mating geometries, and also including fiber optic interface devices having either optical or electrical and optical connection capability over a bent optical path.

BACKGROUND

Optical fiber is increasingly being used for a variety of applications, including but not limited to broadband voice, video, and data transmission. As consumer devices are steadily using more bandwidth, fiber optic interface devices for these devices will likely move away from electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with consumer devices and their interfaces. Additionally, conventional fiber optic interface devices are deployed with great care into relatively clean environments and/or cleaned by the craft before connecting them to a telecommunications device. Further, even though fiber optic interface devices are reconfigurable (i.e., suitable for mating/unmating), they are not intended for a relatively large number of mating cycles. Instead, conventional fiber optic interface devices are high-precision fiber optic connectors designed for reducing insertion loss between mating fiber optic interface devices in the optical network.

On the other hand, consumer electronic devices are expected to have a relatively large number of mating/unmating cycles during ordinary operation. The consumer electronic devices will be operated in a multitude of environments where dirt, dust, and other debris are encountered on a regular basis. Further, consumer electronic devices typically have size and space constraints for making connections. Consequently, there is an unresolved need for fiber optic interface devices suitable for consumer electronic devices.

SUMMARY

An aspect of the disclosure is a fiber optic interface device. The device has a ferrule with a body having front and rear ends. The ferrule body also has an internal cavity adjacent the front end, with the cavity being defined by a rear wall and a bottom wall. The bottom wall has inner and outer surfaces, with at least one of the inner and outer surfaces being curved to define at least one lens. The ferrule body has at least one bore open to the cavity rear wall and the body rear wall. The device includes at least one optical waveguide having an end and that defines a bent optical path. The at least one optical waveguide is supported by the at least one bore so that the bent optical path resides within the cavity and is aligned with the at least one lens. In an example, the bent optical path has a right-angle bend formed by an angled facet at the optical fiber end, or is defined by a bend in an optical fiber.

Another aspect of the disclosure is a fiber optic interface assembly that includes the above-described fiber optic interface device configured as a plug and a second fiber optic interface device configured as a receptacle. The receptacle receives and matingly engages with the plug. The receptacle has a moveable cleaning element that is displaced when the plug and receptacle are matingly engaged. The movement of the cleaning element serves to clean at least one active device disposed adjacent the receptacle, e.g., an optical transmitter and an optical receiver operably supported on a circuit board that also supports the receptacle.

Another aspect of the disclosure is a fiber optic interface device that includes first and second optical fibers that respectively include first and second features that define respective first and second bent optical paths. The device includes a ferrule having a body with front and rear ends and a bottom surface, a central cavity and first and second bores. The first and second bores respectively support the first and second optical fibers so that the first and second features reside within the central cavity. The device also includes first and second lenses formed in the ferrule body and having first and second convex surfaces on the ferrule bottom surface. The first and second lenses are respectively operably aligned with the first and second bent optical paths.

Another aspect of the disclosure is a fiber optic interface assembly. The assembly includes the above-described fiber optic interface device. The assembly also includes a receptacle configured to receive and matingly engage with the fiber optic interface device. The receptacle is supported by a circuit board having first and second active devices. The first and second lenses are configured to provide optical communication between the first and second optical fibers and the respective first and second active devices over the respective first and second bent optical paths.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

FIG. 3A is an elevated view of the plug optical fiber cable, where the plug housing is removed from the plug.

FIG. 3B is similar to FIG. 3A, but with the plug ferrule also removed;

FIG. 7A and FIG. 7B are similar to FIGS. 6A and 6B respectively, but provide more of a front-on view of the receptacle;

DETAILED DESCRIPTION

Reference is now be made in detail to the preferred embodiments of the disclosure, examples of which are illustrated in the accompanying drawings. Whenever possible, like reference numbers are used to refer to like components or parts. Cartesian coordinates are shown in some Figures by way of reference.

The fiber optic interface devices and cable assemblies described herein are suitable for making optical or optical and electrical connections for a variety of devices, and are particularly well suited for consumer electronic devices. The concepts of the disclosure advantageously allow the simple, quick, and economical connection and disconnection of the fiber optic interface devices for a relatively large number of mating cycles.

In the discussion below, the term "electronic device" means a device that has either electronic or optical and electronic components and functionality, including a fiber optic interface device and associated hardware configured to receive, transmit, or both transmit and receive optical signals and also communicate electrical power.

Also, terms such as vertical, horizontal, upward, downward, etc. are used for convenience of description in order to describe relative directions, orientations, etc., and are not intended to be limiting with regard to a particular direction, orientation, etc.

In addition, the term "bent optical path" can be an optical path that has a sharp turn or a gradual turn, or both, and is shorthand for an optical path that has a change in direction.

Figure 1A:
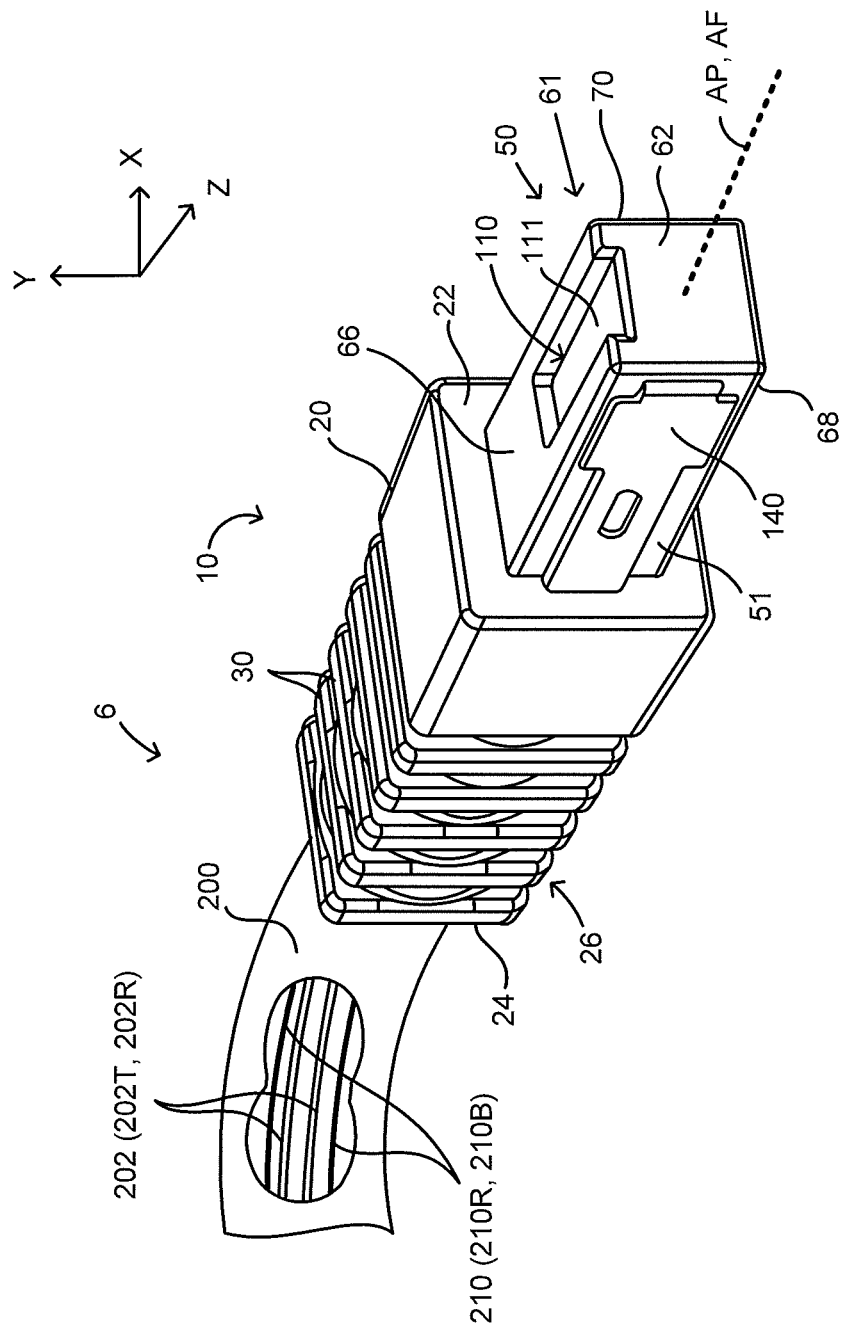
FIG. 1A though FIG. 1D are elevated views of an example fiber optic cable system that includes a fiber optic interface device connected to a fiber optic cable.
Figure 1B:
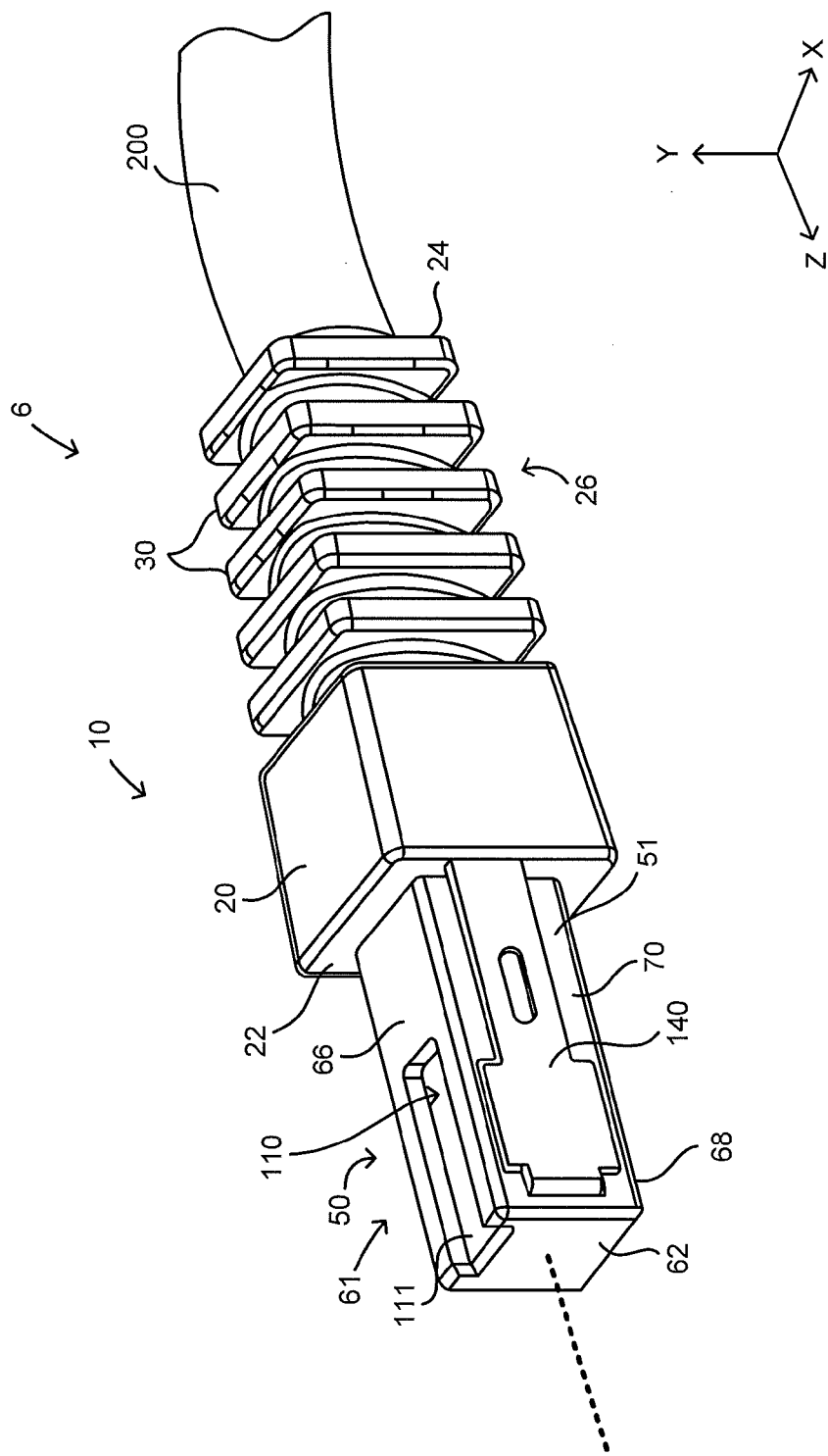
Figure 1C:
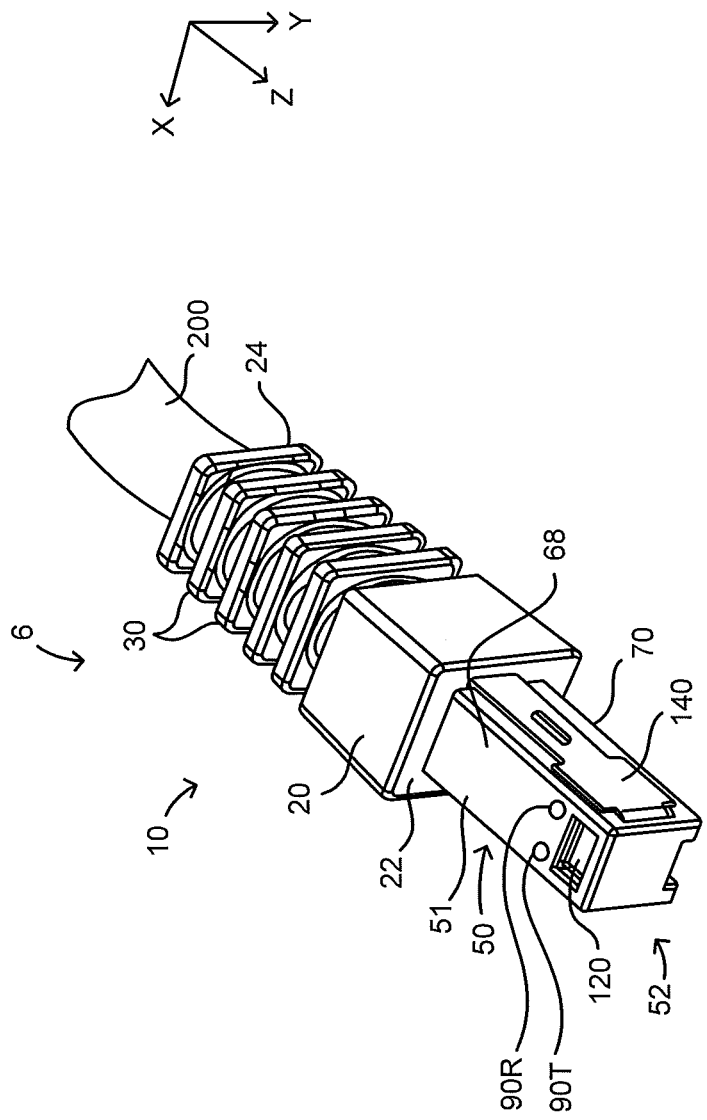
Figure 1D:
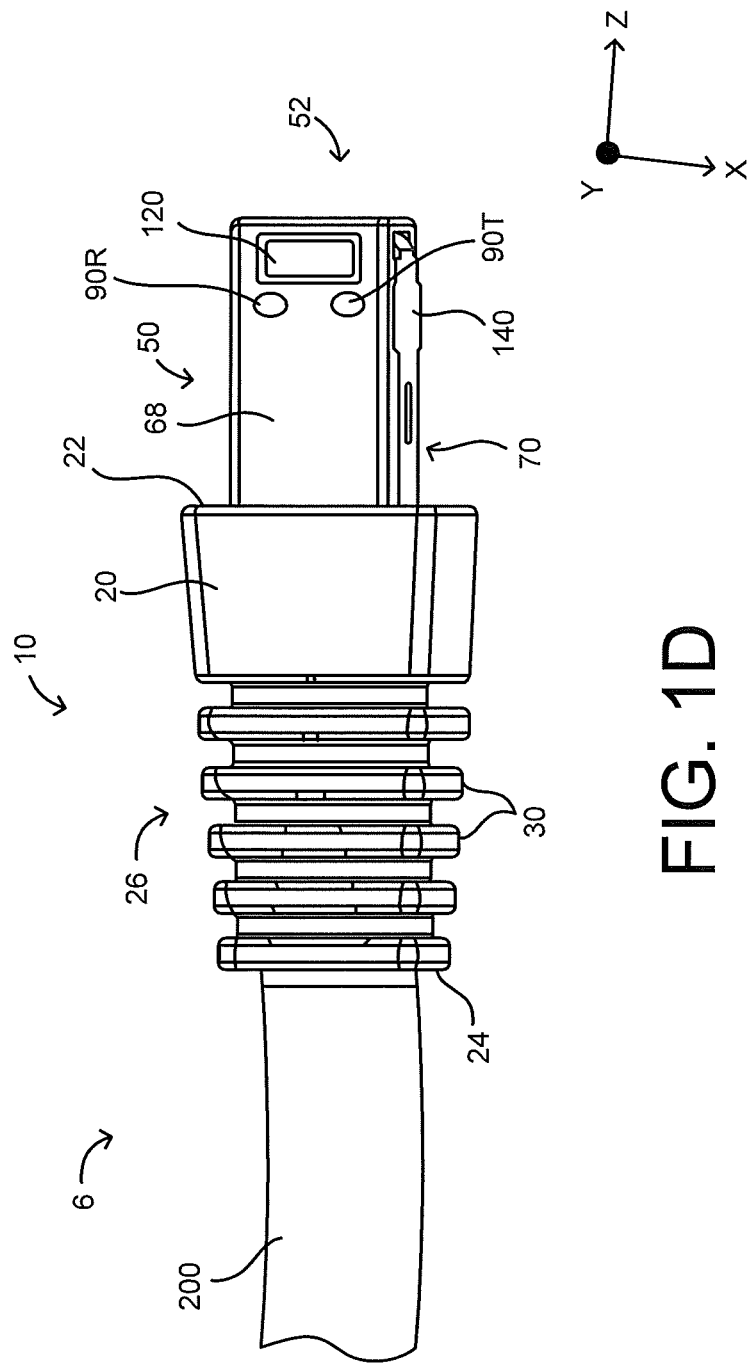

FIG. 1A and FIG. 1B are top-down elevated views and FIGS. 1C and 1D are bottom-up elevated views of an example fiber optic cable system 6 that includes a fiber optic interface device 10 connected to a fiber optic cable 200. Fiber optic cable 200 carries at least one optical fiber 202 having an end 202E, and optionally carries at least one electrical wire 210 having an end 210E (see FIG. 2C, introduced and discussed below). In an example, fiber optic cable 200 carries transmit and receive optical fibers 202T and 202R, and first and second electrical wires 210R and 210B ("red and black") that carry electrical power.

Fiber optic interface device 10 is shown in the form of a plug-type of optical fiber connector and so is referred to as "plug 10" hereinbelow for ease of discussion and to distinguish between other fiber optic interface devices such as receptacles, as introduced below. Plug 10 has a central axis AP and includes a housing 20 having a front end 22 and a rear end 24, with a rear section 26 configured with strain-relief features 30. Housing 20 supports a plug ferrule 50 with a plug ferrule axis AF, described in greater detail below. Housing 20 includes a central axis AH.

Figure 2A:
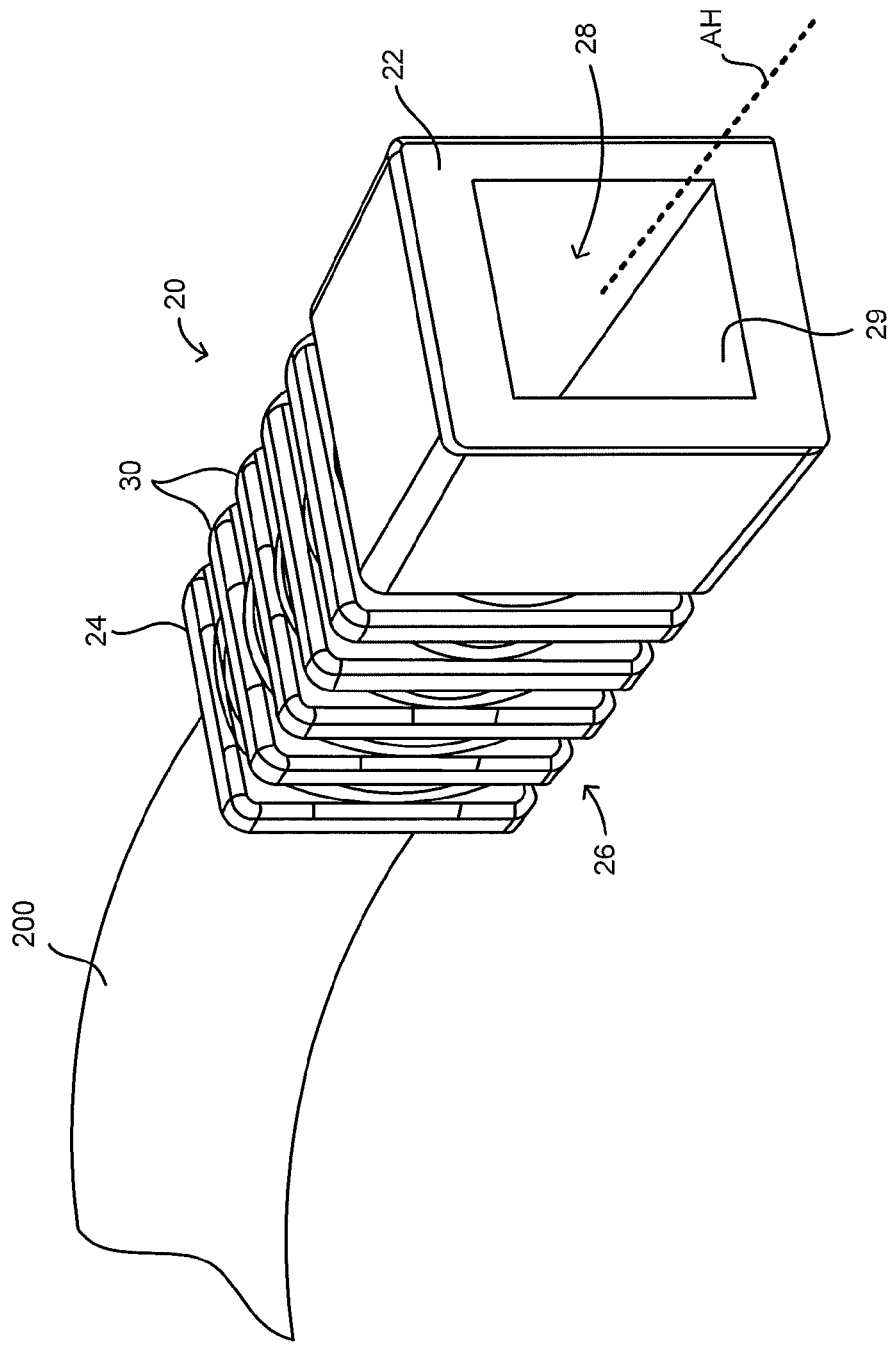
FIG. 2A is similar to FIG. 1A, but shows the plug without the ferrule.
Figure 2B:
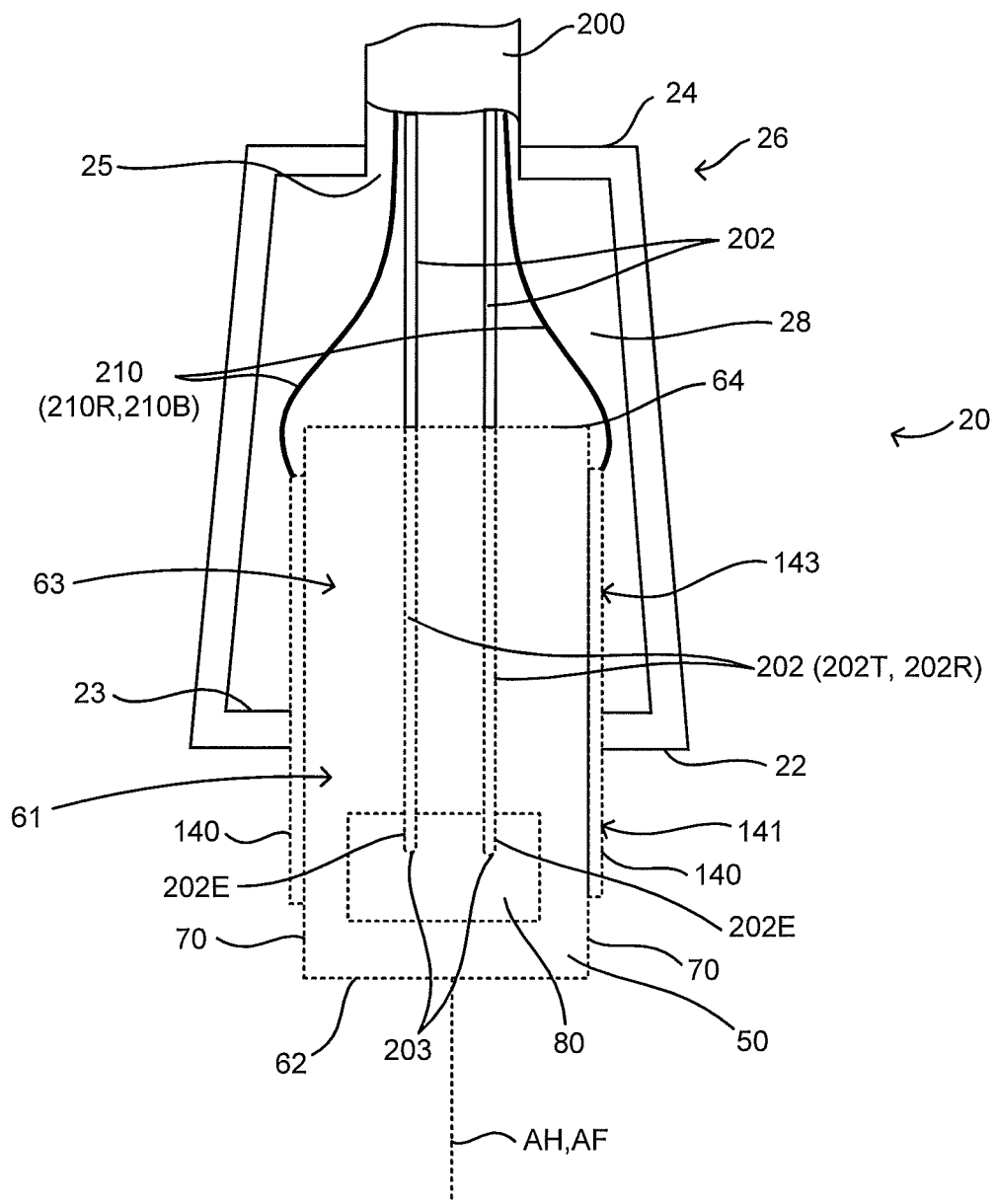
FIG. 2B is a cut-away view of the plug housing as viewed in the X-Z plane, along with the optical fiber cable.
Figure 2C:
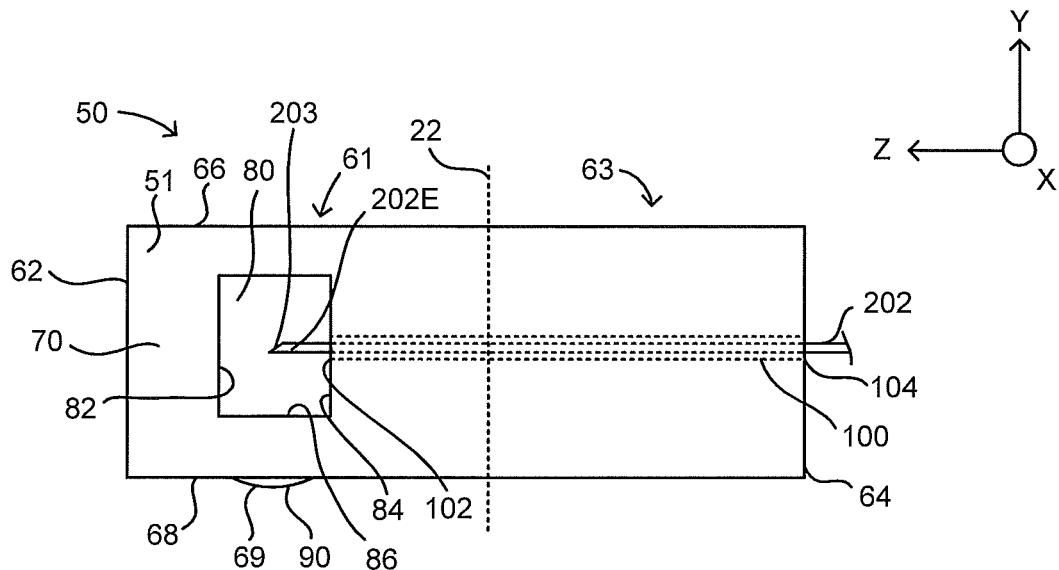
FIG. 2C is a side view of an example ferrule that includes an optical fiber having an end with a facet that defines a bent optical path.
Figure 2D:
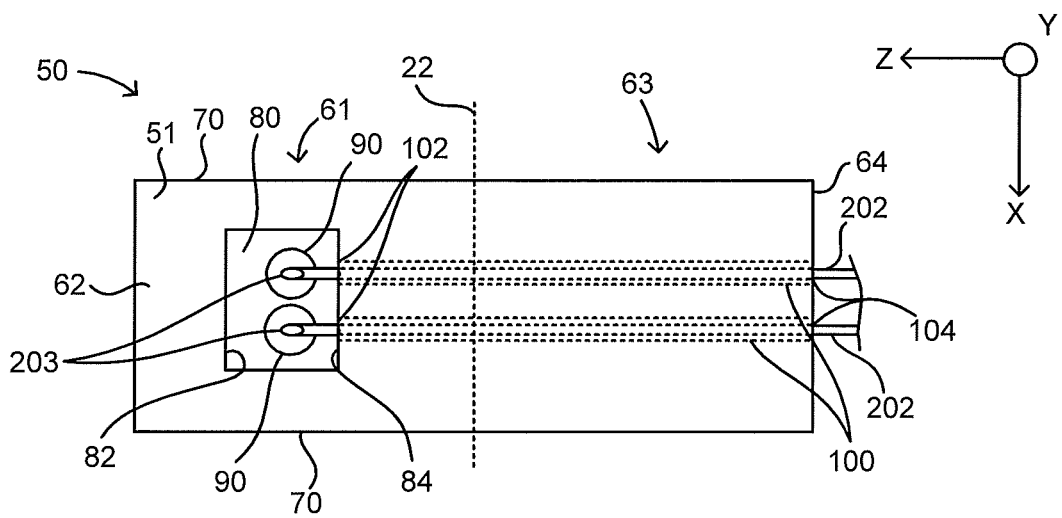
FIG. 2D is a top-down view of the example ferrule of FIG. 2C showing two optical fibers and the corresponding plug lenses.

FIG. 2A is similar to FIG. 1A but shows plug 10 without ferrule 50 (ferrule 50 is shown in phantom). FIG. 2B is a cut-away view of housing 20 as viewed in the X-Z plane, along with fiber optic cable 200. FIG. 2C is a side view of ferrule 50, while FIG. 2D is a top-down view of the ferrule. FIG. 3A is an elevated view of plug 10 and fiber optic cable 200, where housing 20 is removed from the plug. FIG. 3B is similar to FIG. 3A, but with the plug ferrule 50 also removed.

With reference also now to FIG. 2A through FIG. 2D and also to FIGS. 3A and 3B, housing 20 defines a housing interior 28 open at housing front end 22. Housing 20 also includes an aperture 25 at rear end 24. Interior 28 is in part defined by an interior wall 23 at housing front end 22. Fiber optic cable 200 is operably connected to housing 20 at housing rear end 24. The at least one optical fiber 202 and the at least one electrical wire 210 passes through rear-end aperture 25 to enter housing interior 28. In FIG. 2B, FIG. 2C and in FIGS. 3A and 3B, transmit and receive optical fibers 202T and 202R are shown, as are electrical wires 210R and 210B.

Plug ferrule 50 includes a plug ferrule body 51 having an axis AF. Ferrule body 51 includes a front section 61 with a front end 62 that extends from housing front end 22 and a rear section 63 with a rear end 64 that resides within housing interior 28. Plug ferrule body 51 also has a top surface 66 and a bottom surface 68, and opposite sides 70. In an example, plug ferrule body 51 has a substantially rectangular cross-sectional shape, and in a more specific example has a substantially square cross-sectional shape. In an example, ferrule front end 62 has dimension in the X-direction or the Y-direction of between about 2 mm and about 3 mm.

Plug ferrule 50 further includes a cavity 80 in plug ferrule front section 61 that includes a front wall 82 toward ferrule body front end 62, a rear wall 84 located axially rearward from the front wall toward ferrule body rear end 64, and a bottom wall 86. Plug ferrule cavity 80 can be open at sides 70 of plug ferrule body 51. Bottom surface 68 of plug ferrule body 51 includes at least one curved portion 69 that together with bottom wall 86 and the intervening portion of plug ferrule body 51, defines at least one lens 90. In an example, bottom wall 86 is planar, while in another example bottom wall 86 can have a curvature that complements the curved portion of bottom surface 68 to further define lens 90. In an example, plug ferrule 50 supports two lenses 90 as shown. In example, lens 90 includes at least one convex surface 69.

Plug ferrule body 51 further includes at least one bore 100 having front end 102 at rear wall 84 of plug ferrule cavity 80, and a rear end 104 at plug ferrule rear end 54. The at least one bore 100 is sized to support at least one optical fiber 202. In an example, plug ferrule body 51 includes first and second bores 100 that respectively support first and second (e.g., transmit and receive) optical fibers 202 (e.g., 202T and 202R), as discussed below.

Plug ferrule 50 also includes a keying feature 110. Keying feature 110 serves to ensure a select orientation (polarity) of plug ferrule 50 when plug 10 is matingly engaged with another fiber optic interface device, such as a complementary configured receptacle 320, introduced and discussed below. An example keying feature 110 is configured as a recess formed in top surface 66 of plug ferrule body 51.

Plug ferrule 50 additionally includes a latching feature 120 configured for latching the plug ferrule to another fiber optic interface device when the two are matingly engaged. An example latching feature 120 is a detent in bottom surface 68 of plug ferrule body 51, the detent being located between lens 90 and ferrule body front end 62 in one example.

Plug ferrule 50 is held fixed within plug ferrule housing interior 28 by the plug housing 20 being configured to tightly secure the ferrule within the plug housing. In another example configuration, plug ferrule 50 can be held securely within plug housing interior 28 using a ferrule holder (not shown) that resides within housing interior 28 and that is fixed to housing 20 and that is sized to tightly secure plug ferrule 50.

Plug 10 includes at least one electrical contacts 140 disposed on at least one side 70 of plug ferrule 50. Two electrical contacts 140 disposed on the two sides 70 of plug ferrule 50 are shown. Electrical contacts 140 have a front section 141 at plug ferrule front section 61 and a rear section 143 adjacent plug ferrule rear section 63. Electrical contact rear sections 143 reside within housing interior 28 and are electrically connected to respective electrical wires 210 carried by fiber optic cable 200 and that pass into housing interior 28 via rear-end aperture 25 of plug housing 20.

Transmit and receive optical fibers 202T and 202R from fiber optic cable 200 are supported in bores 100 of plug ferrule 50. Generally, optical fibers 202 are supported in bores 100 such that they pass into cavity 80. Optical fibers 202 define a portion of an optical path that includes a bent optical path BOP, where the bent optical path resides within cavity 80 (see e.g., FIG. 2E and FIG. 2F, introduced and discussed below). In an example, the bent optical path is defined by a light-bending feature within cavity 80, and examples of such features are discussed below. Bent optical path BOP is aligned with lens 90 so that light traveling in optical fiber 202 is provided to lens 90.

In one example, the light-bending feature comprises an angled facet 203 formed on an optical fiber end 202E, which end reside within cavity 80. In an example, angled facet 203 is angled such that light traveling in optical fiber 202 is internally reflected directly downward (i.e., at a right angle from its original direction) towards lens 90. Optical fiber ends 202E of the transmit and receive optical fibers 202T and 202R include respective angled end facets 203 that define one example of a bent optical path, as discussed in greater detail below.

Figure 2E:
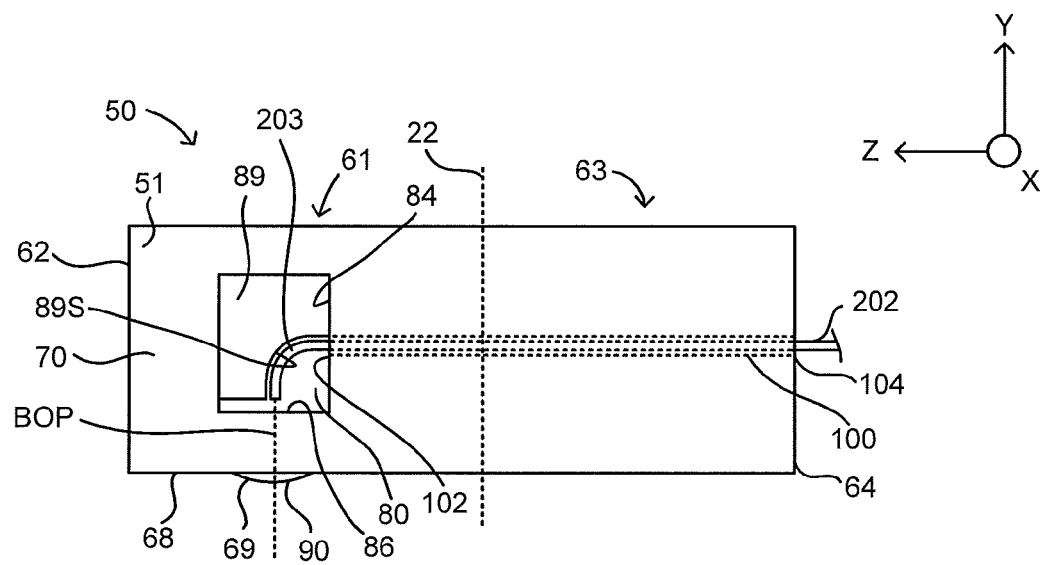
FIG. 2E and FIG. 2F are similar to FIG. 2C and FIG. 2D and illustrate different examples of defining a bent optical path.

FIG. 2E is similar to the side view of FIG. 2C and illustrates another example of plug ferrule 50 having an optical fiber 202 (or multiple optical fibers 202, as the case may be), wherein optical fiber 202 includes a bend 203 within cavity 80. Bend 203 serves as an optical-path-bending feature that defines bent optical path BOP. Bend 203 is formed such that optical fiber end 202E is optically (operably) aligned with lens 90. In an example, optical fiber end 202E is held in place with a bending member 89 disposed within cavity 80. Bending member 89 includes a curved surface 89S that corresponds to the desired bend radius of optical fiber 202. In an example, bending member 89 can be formed from or otherwise defined by a portion of ferrule body 51.

Figure 2F:
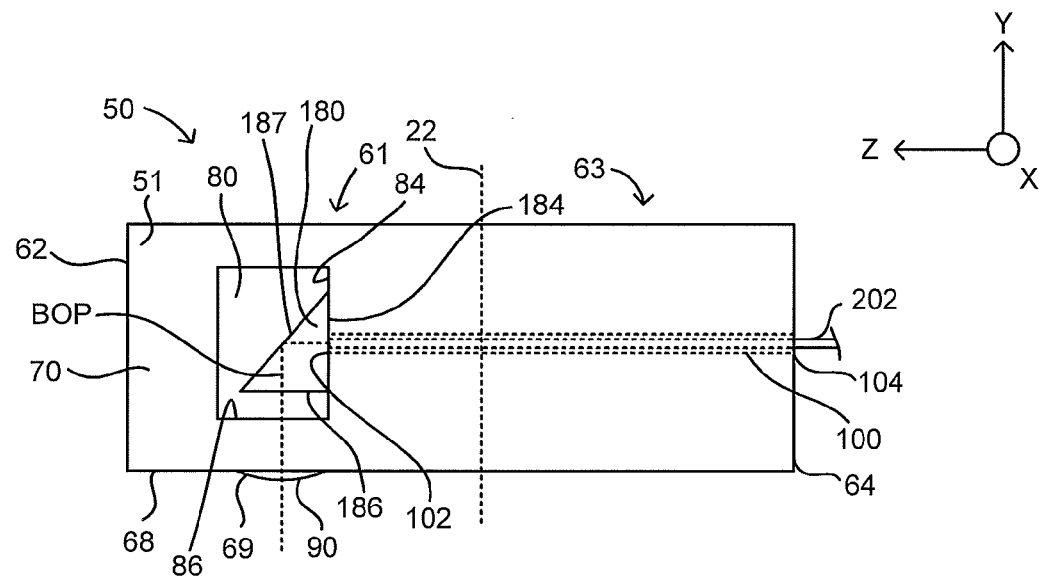

FIG. 2F is similar to FIG. 2E and illustrates another example of plug ferrule 50 where optical fiber end 202E is arranged at or adjacent cavity rear wall 84. In the instant example, a prism 180 is disposed within cavity 80 and includes a first surface 184 adjacent cavity rear wall 84 and thus adjacent optical fiber end 202E. Prism 180 also includes a second surface 186 adjacent bottom wall 86. Prism 180 also includes an angled surface 187 that serves as an optical-path-bending feature that defines bent optical path BOP within cavity 80. Bent optical path BOP provides optical communication between optical fiber(s) 202 and lens(es) 90.

Figure 4A:
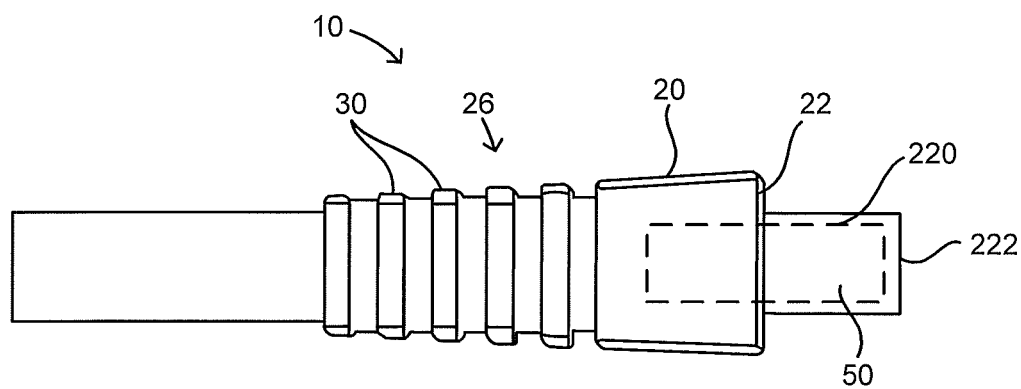
FIG. 4A and FIG. 4B are bottom-up views of the plug, illustrating an example where the plug includes a retractable cover.
Figure 4B:
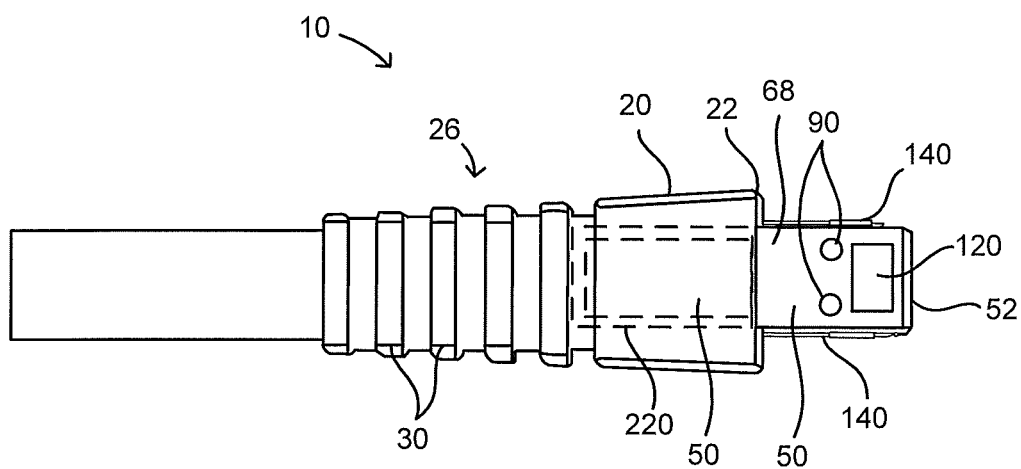

FIG. 4A and FIG. 4B are bottom-up views of plug 10 illustrating an example plug that includes a retractable cover 220. Cover 220 has a front end 222. Cover 220 is generally cylindrical and has a cross-sectional shape that corresponds to that of plug ferrule body 51 so that the cover can slide over the plug ferrule body front section 61. Other types of covers 220, such as those that flip onto and off of plug ferrule 50, can also be used. An internal biasing member 240, such as a spring (not shown), is used to provide cover 220 with a forward bias so that the cover remains in place over plug ferrule 50 when the plug is not in use, but that allows the cover to at least partially slide in the axial direction into housing interior 28 when plug 10 is engaged with another fiber optic interface device.

Figure 5:
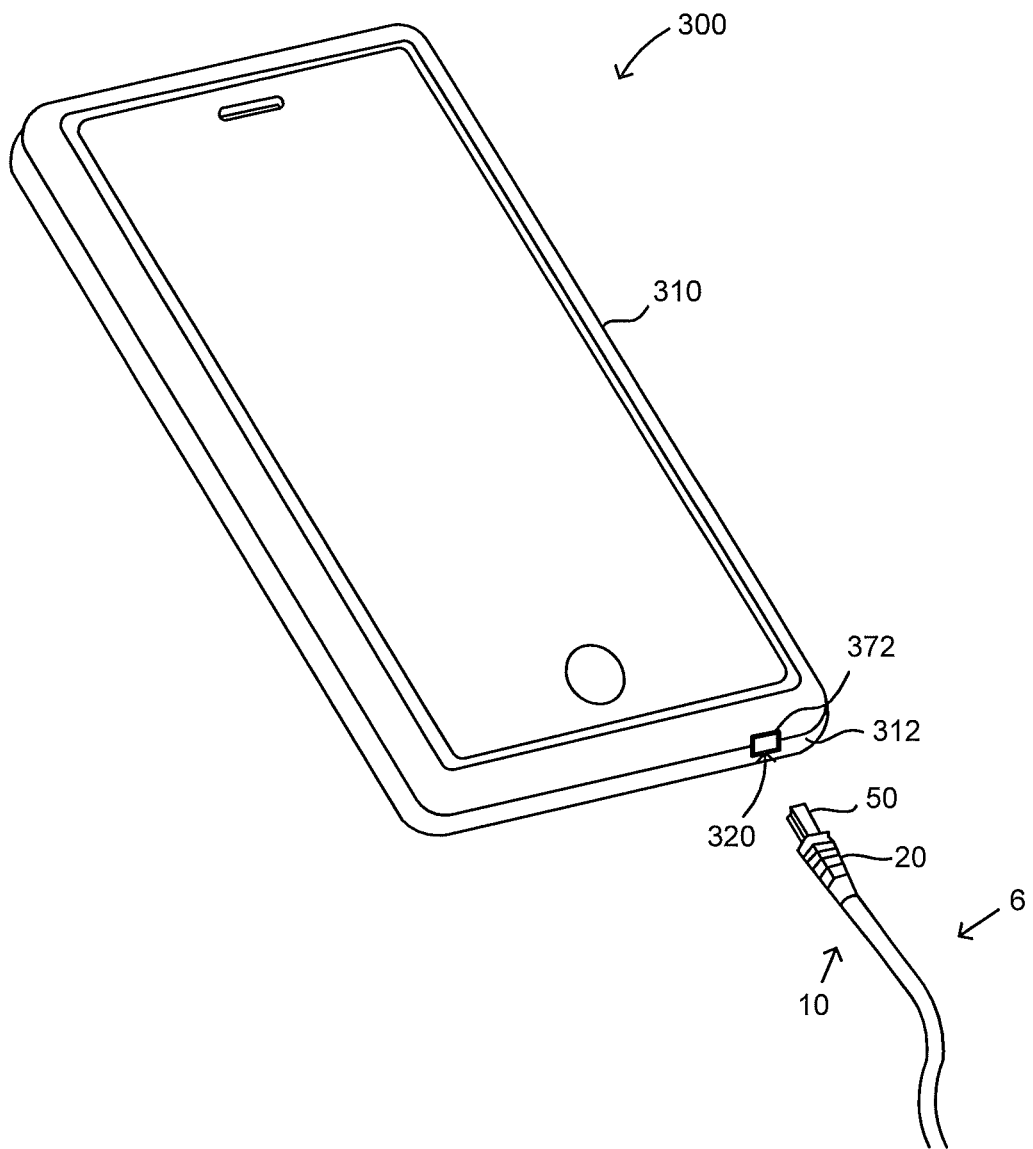
FIG. 5 is an elevated view of an example electronic device along with the fiber optic cable system adjacent, but not connected to, the electronic device.

FIG. 5 is an elevated view of an example electronic device 300 along with fiber optic cable system 6 adjacent but not connected to the electronic device. Electronic device 300 includes a housing 310 having a side 312. Housing 310 supports a fiber optic interface device 320 having a complementary geometry to plug 10. As fiber optic interface device 320 is configured to receive and engagingly mate with plug 10, fiber optic interface device 320 is referred to hereinafter as receptacle 320 for ease of discussion.

Figure 6A:
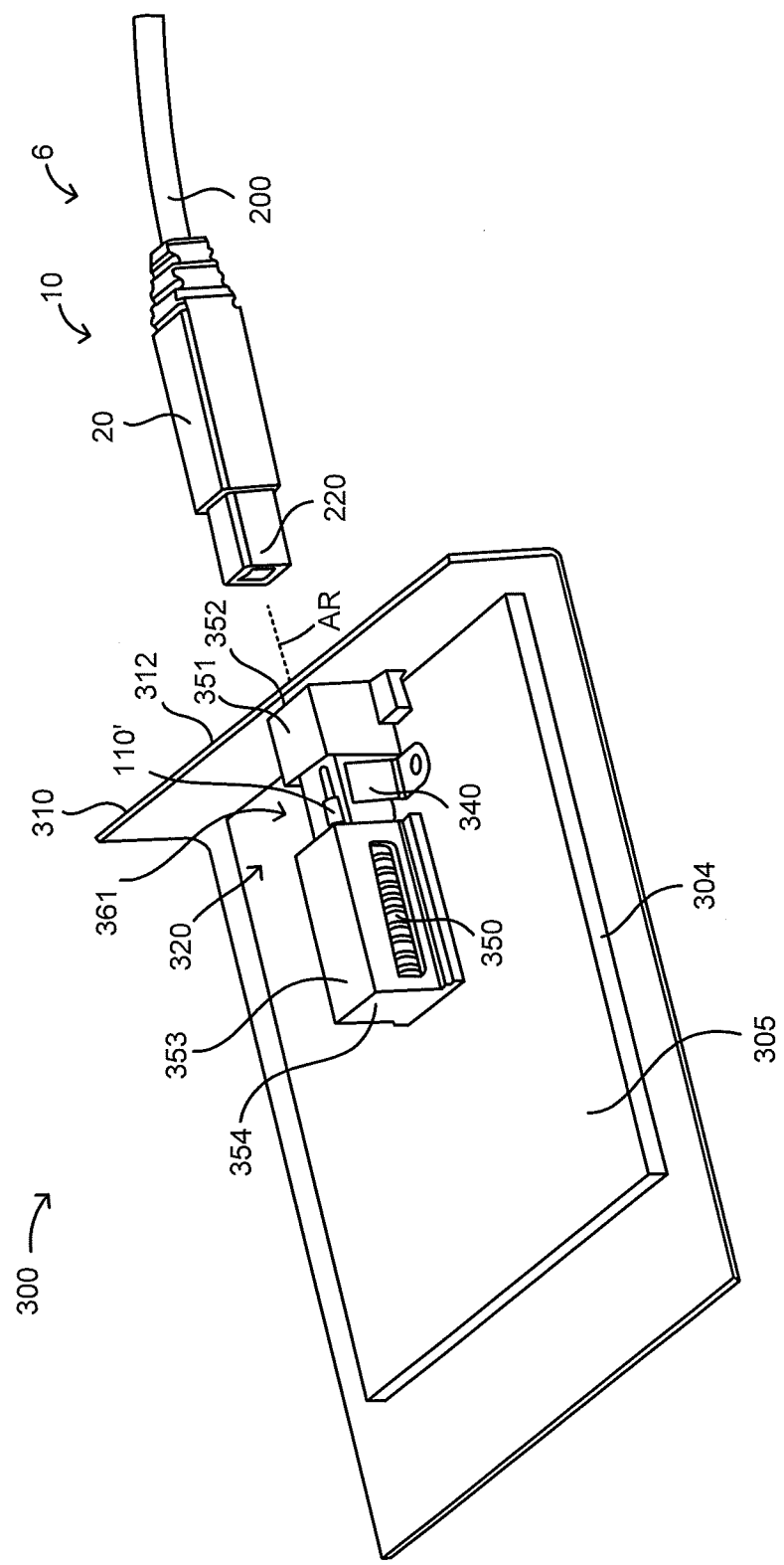
FIG. 6A and FIG. 6B are close-up, cut-away views of the electronic device, shown with the plug adjacent the receptacle (FIG. 6A) and with the plug matingly engaged with the receptacle (FIG. 6B)
Figure 6B:
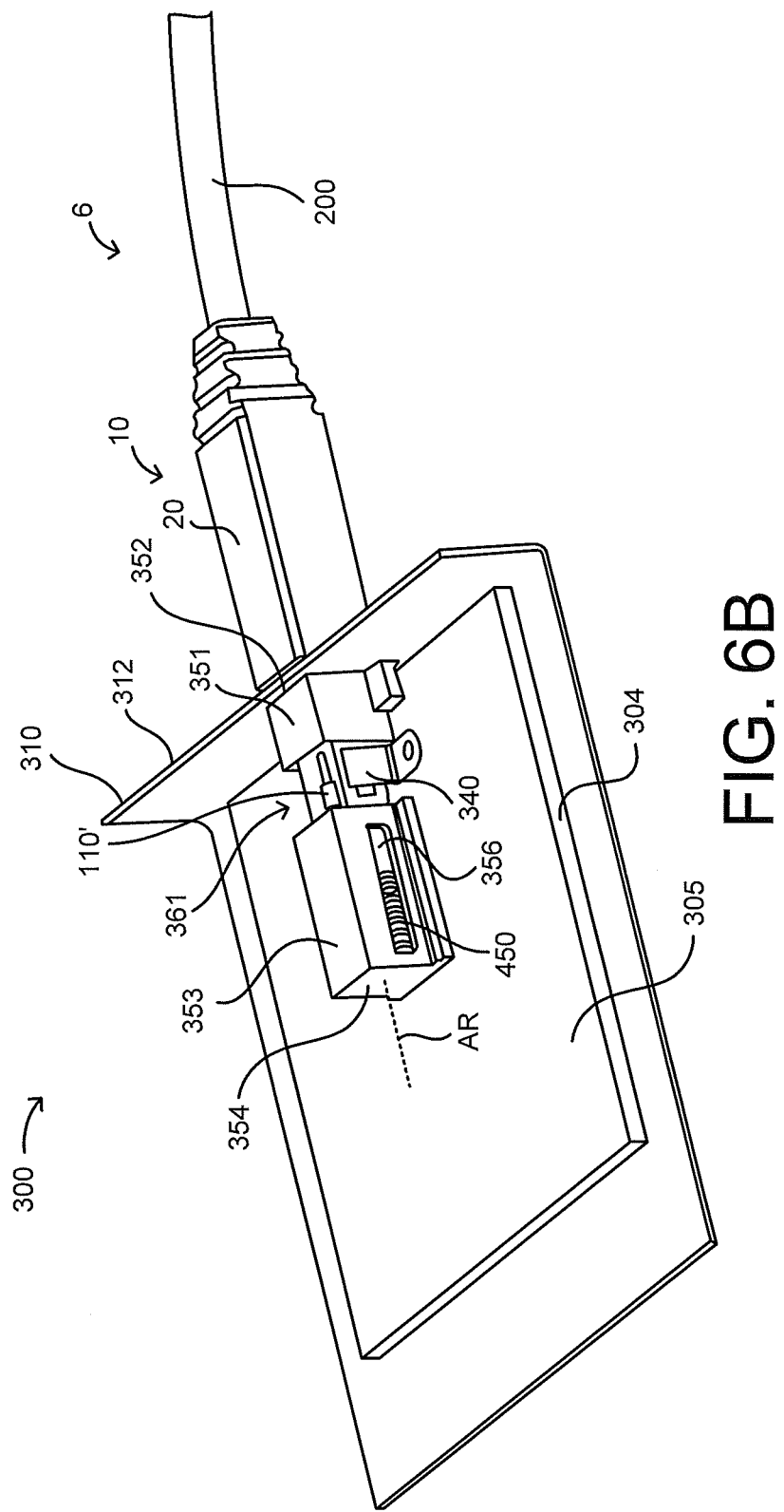
Figure 8A:
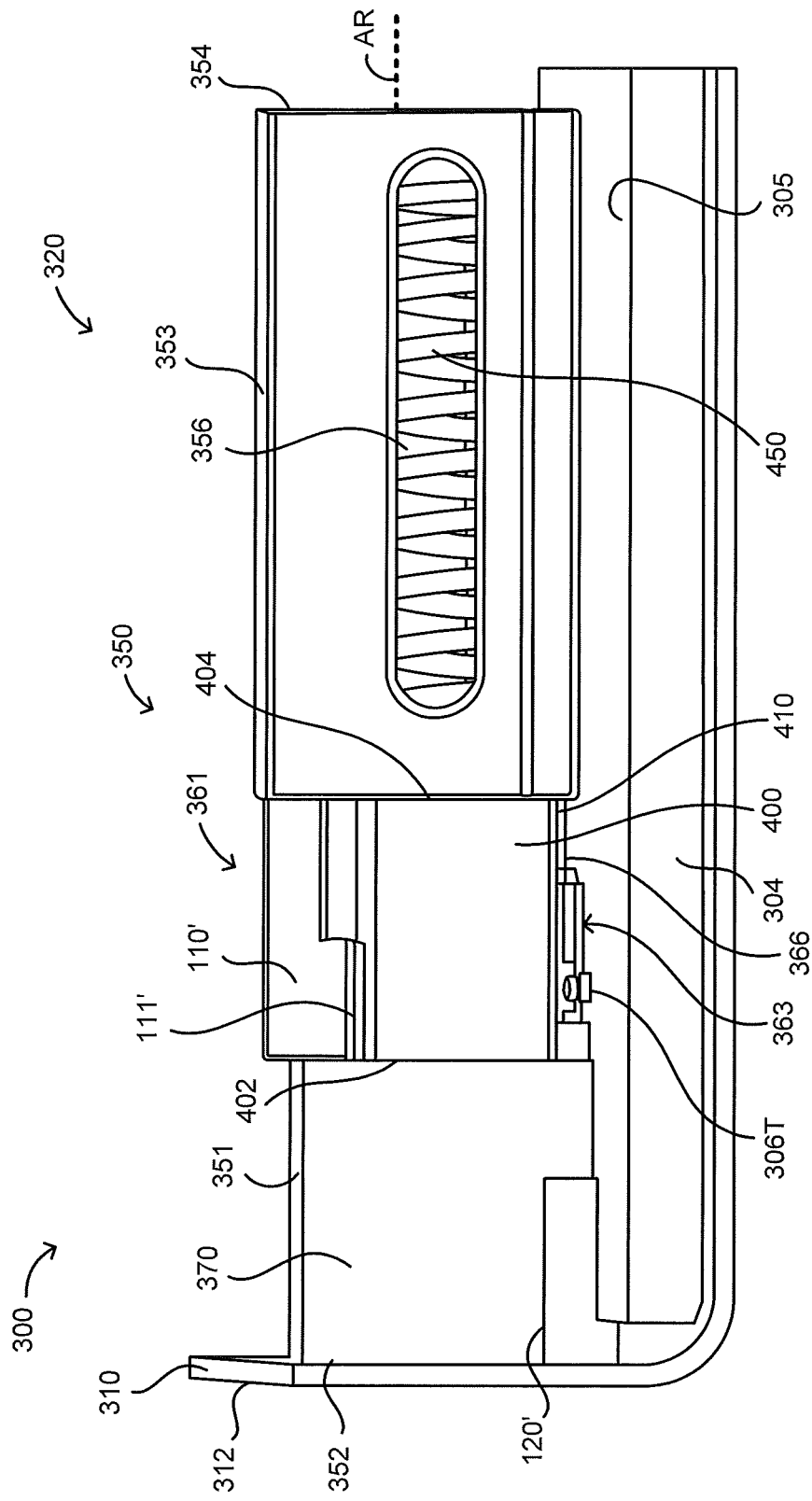
FIG. 8A is a close-up side view of the receptacle.
Figure 8B:
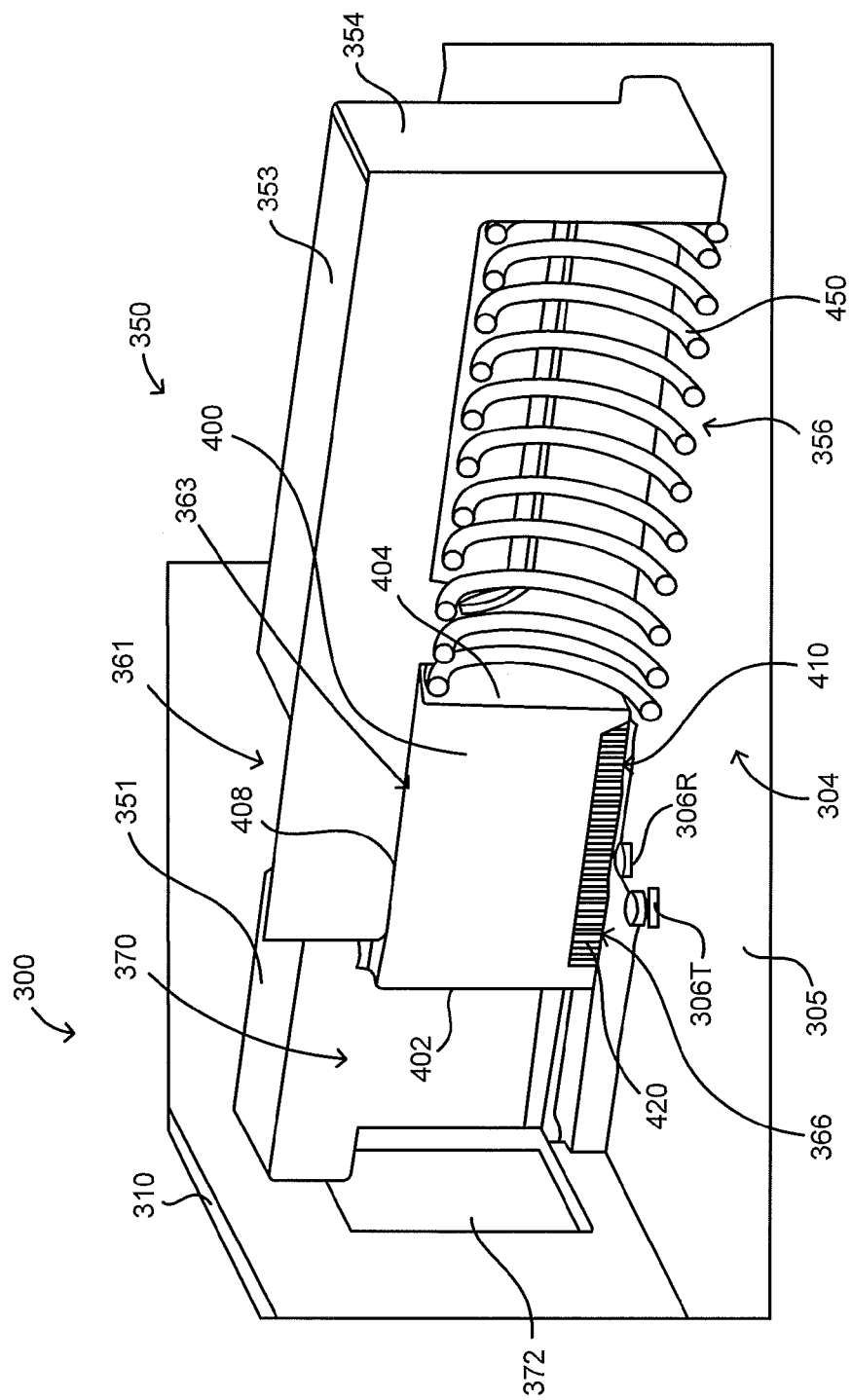
FIG. 8B is an elevated cut-away rear view of the receptacle.
Figure 8C:
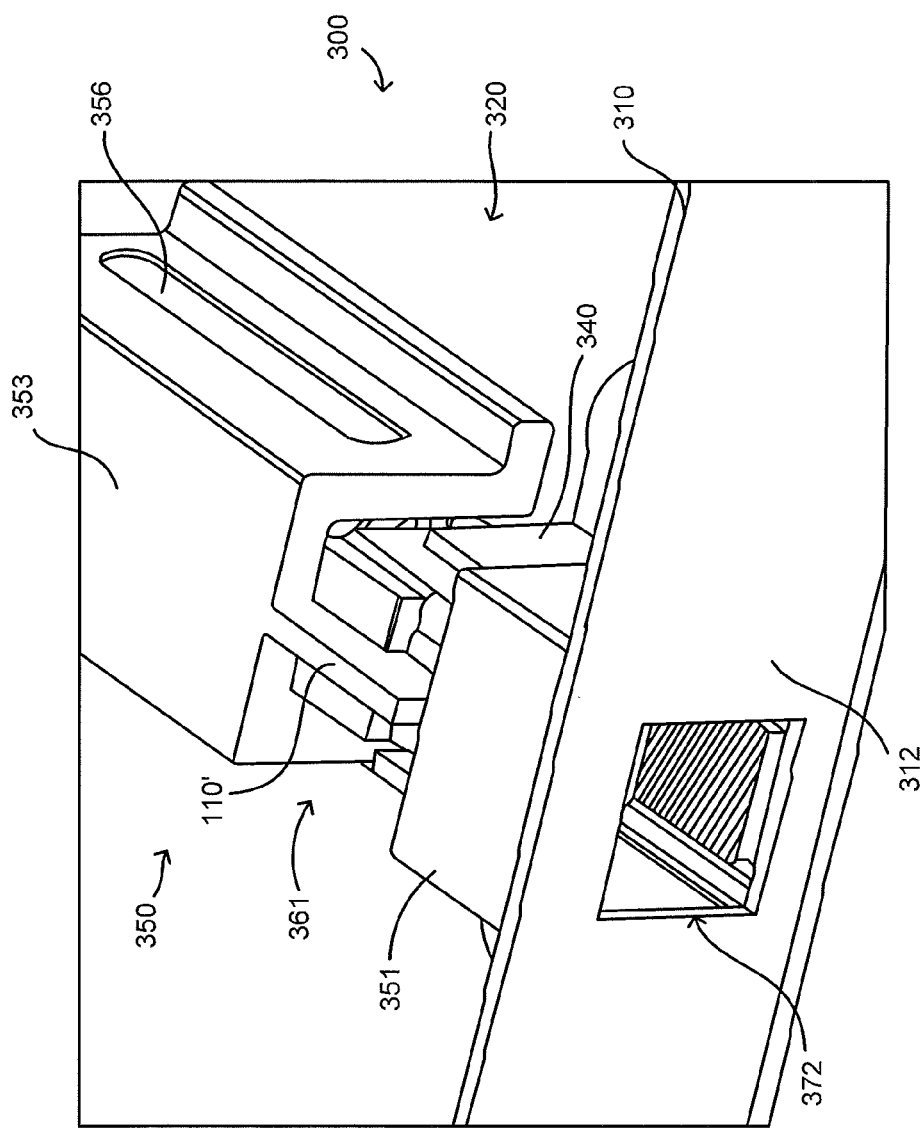
FIG. 8C is an elevated cut-away front view of the receptacle.
Figure 8D:
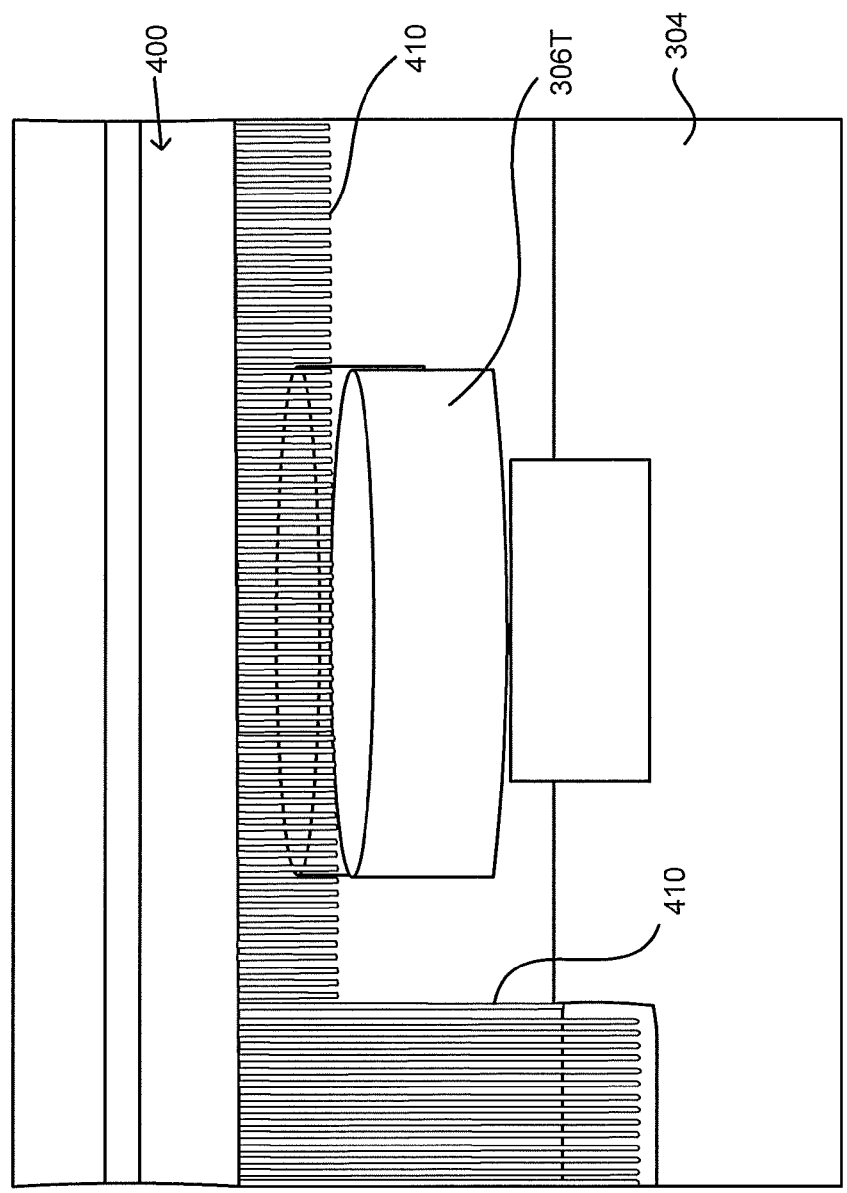
FIG. 8D is a close-up view of the cleaning member residing over the optical transmitter and optical receiver when the plug is not matingly engaged with the receptacle.

FIG. 6A and FIG. 6B are close-up, cut-away views of electronic device 300 shown with plug 10 adjacent receptacle 320 (FIG. 6A), and with the plug matingly engaged with the receptacle (FIG. 6B). FIG. 7A and FIG. 7B are similar to FIGS. 6A and 6B respectively, but provide more of a front-on view of receptacle 320. FIG. 8A is a close-up side view of receptacle 320 and FIG. 8B is an elevated cut-away rear view of receptacle 320. FIG. 8C is an elevated cut-away front view of receptacle 320.

With reference to FIG. 6A through FIG. 8C, Electronic device 300 includes a circuit board 304 having a substantially planar surface 305 that supports receptacle 320 adjacent side 312. Circuit board 304 supports first and second active devices, e.g., a light emitter (i.e., an optical transmitter") 306T and a photodetector (optical receiver") 306R (see FIG. 8A and FIG. 8B). An example of optical transmitter 306T is a vertical-cavity surface-emitting laser (VCSEL), and an example of optical receiver 306R is a photodetector such as a photodiode. Optical transmitter 306T and optical receiver 306R are configured to respective emit transmit light 600T and detect receive light 600R at substantially a right-angle to circuit board planar surface 305.

Receptacle 320 also has a central axis AR, and includes a receptacle housing 350 having a front section 351 with a front end 352 and a rear section 353 with a rear end 354. Front and rear housing sections 351 and 353 are separated by an open mid-section 361.

Receptacle housing front section 351 defines a front-section interior 370 and a front-end aperture 372, both sized to receive and engage plug ferrule 50. Receptacle housing rear section 353 defines a rear-section interior 356. Receptacle housing 350 is supported by circuit board 304. Receptacle housing open mid-section 361 is open at a mid-section opening 366 to circuit board 304 and to the optical transmitter 306T and the optical receiver 306R operably supported by the circuit board.

With reference to FIG. 8C, receptacle electrical contacts 340 are arranged on opposite sides of open mid-section 361 of receptacle housing 350 and are configured to contact plug contacts 140 when plug 10 matingly engages receptacle 320. Receptacle electrical contacts 340 are operably contacted to circuit board 304 and allow for electrical device 300 to transmit or receive electrical power through receptacle 320.

In an example, receptacle 320 includes a keying feature 110' that complements keying feature 110 on plug ferrule 50 so that the plug ferrule enters reticle front-end aperture 372 with the proper orientation. In an example, receptacle keying feature 110' extends from rear section 353 of receptacle housing 350 and extends over open mid-section 361, and includes a tongue portion 111' configured to engage a groove 111 of plug keying feature 110.

In addition, front-section interior 370 also optionally includes a latching feature 120' that complements latching feature 120 on plug ferrule 50 so that the plug ferrule is removably secured within front-section interior 370.

Receptacle 320 includes a cleaning member 400 movably disposed in mid-section interior 363 of housing mid-section 361. Cleaning member 400 includes respective front and rear ends 402 and 404, a top 408 and a bottom 410. Bottom 410 includes a cleaning element 420. Cleaning member 400 can also be disposed in receptacle housing front section 351.

Receptacle 320 further includes a resilient member 450 disposed in rear-section interior 364 and engaged with rear end 404 of cleaning member 400. Resilient member 450 serves to forward-bias cleaning member 400 so that it resides in mid-section interior 363 in the absence of an axial force on the cleaning member. While residing in mid-section interior 363, cleaning member 400 resides over mid-section opening 366, with cleaning element 420 either residing over or being in contact with optical transmitter and optical receiver 306T and 306R. This is illustrated in FIG. 8B and in the close-up view of FIG. 8D. This position of cleaning member 400 serves to maintain the cleanliness of optical transmitter and optical receiver 306T and 306R.

Figure 9A:
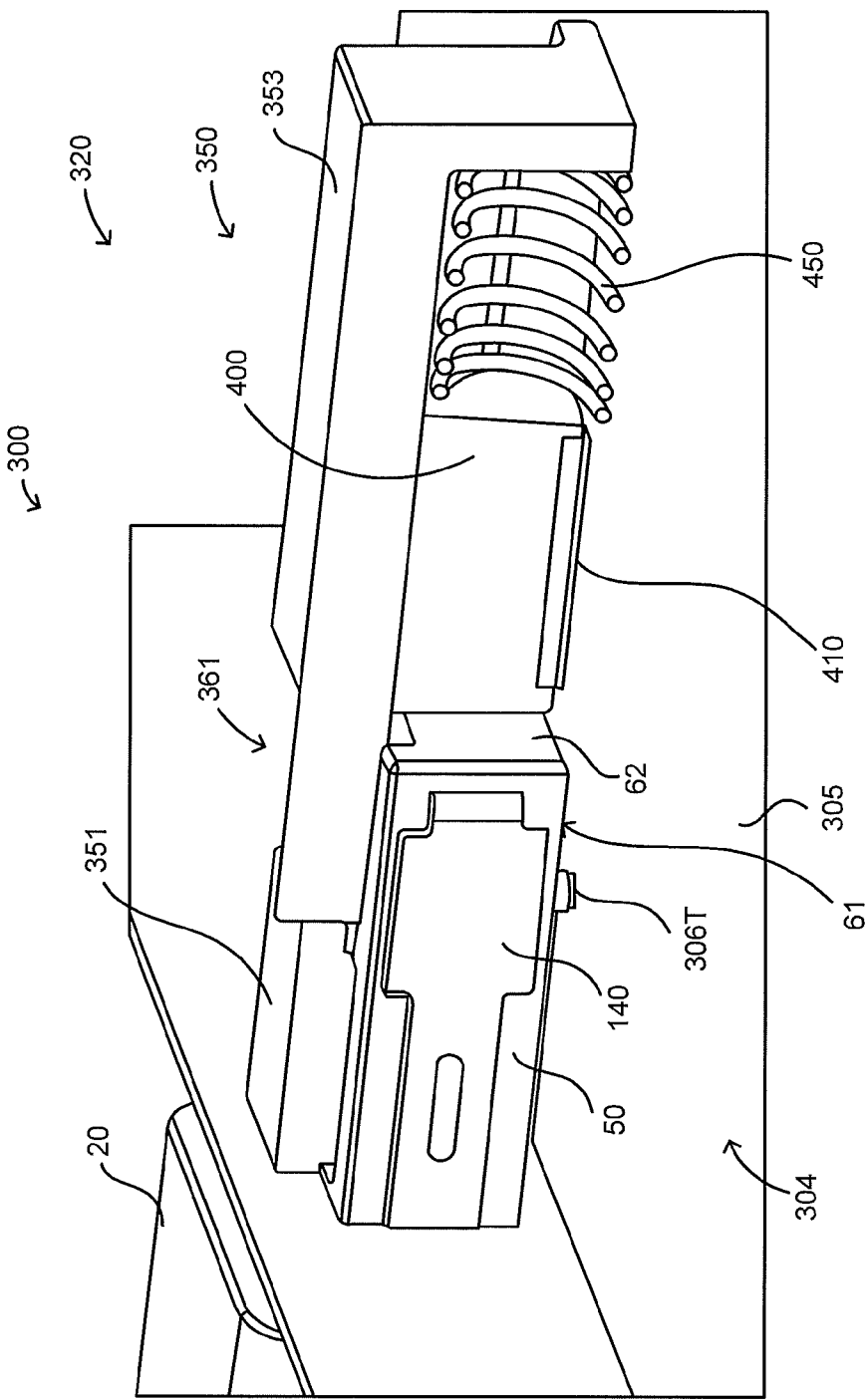
FIG. 9A through FIG. 9C are similar elevated cut-away views of the plug as matingly engaged with the receptacle to form a fiber optic interface assembly.
Figure 9B:
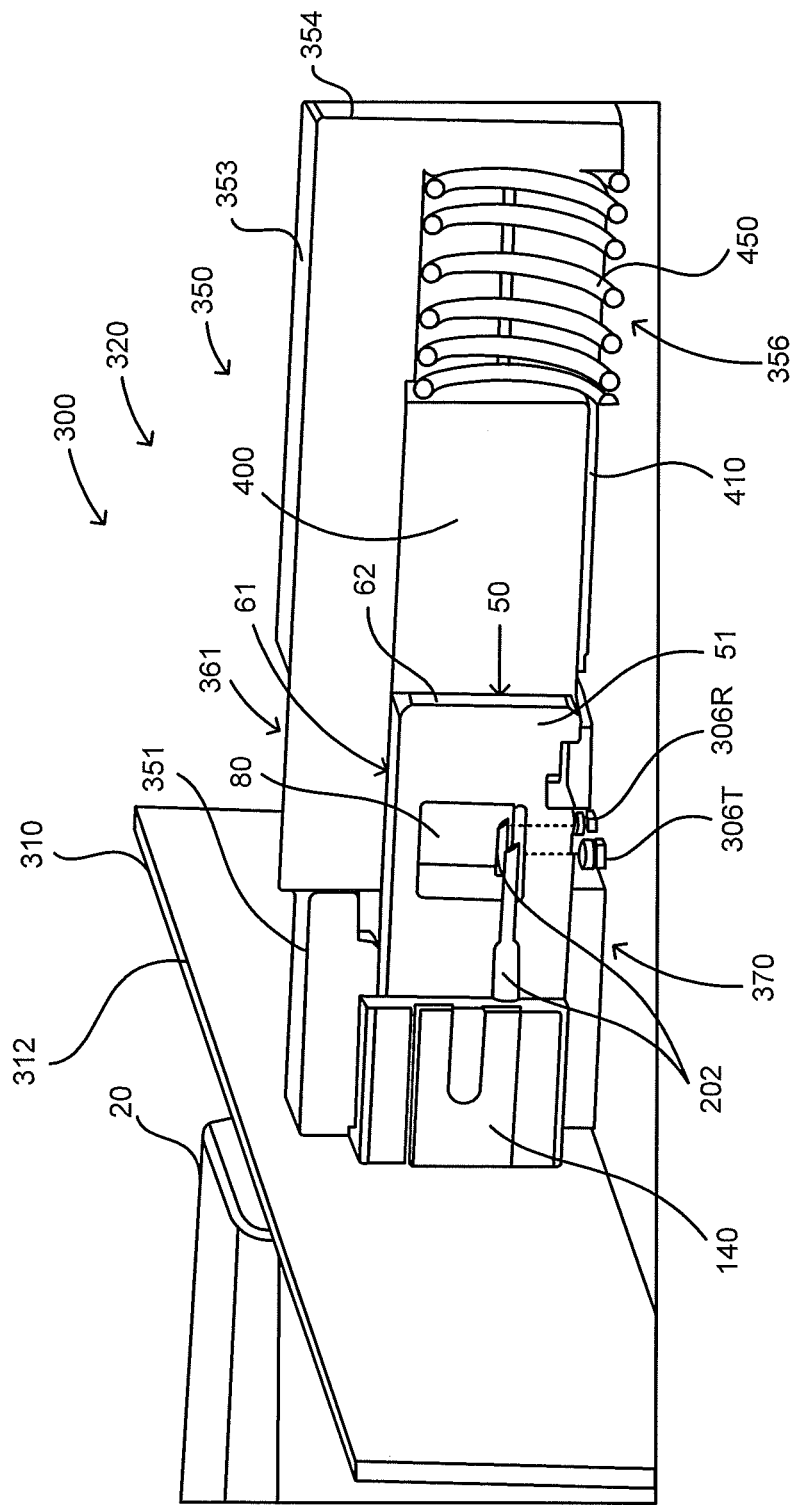
Figure 9C:
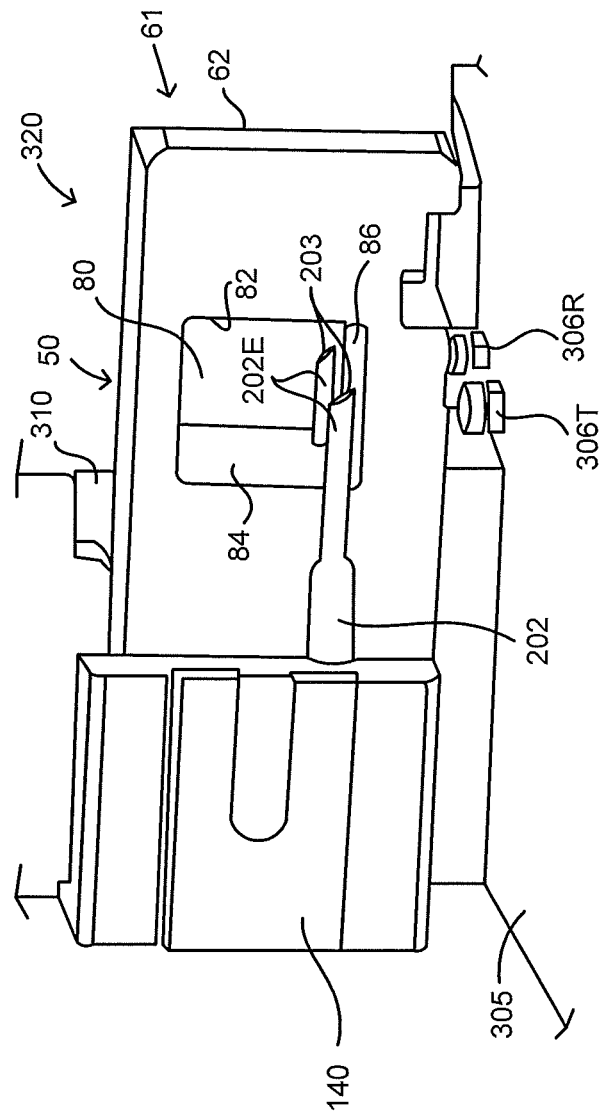

FIG. 9A through 9C are similar elevated, cut-away views of plug 10 as matingly engaged with receptacle 320 to form a fiber optic interface assembly 330. When plug 10 is matingly engaged with receptacle 320, plug ferrule 50 first enters front-end aperture 372 and enters front-end section interior 370. As plug ferrule 50 enters farther into receptacle housing 350, front end 62 of plug ferrule body front section 61 contacts front end 402 of cleaning member 400.

As plug ferrule 50 is urged farther into receptacle housing 350, it urges cleaning member 400 to move axially rearward into rear-section interior 356, which movement serves to compresses resilient member 450. Once plug 10 is fully matingly engaged with receptacle 320, cleaning member 400 resides in a rear-biased position within rear-section interior 356 of housing rear section 353. Thus, plug ferrule 50 serves to axially displace cleaning member 400.

Thus, the movement (displacement) of cleaning member 400 results in cleaning element 420 rubbing against transmitter 306T and receiver 306R, which serves to wipe contaminants off of the transmitter and receiver.

Figure 10A:
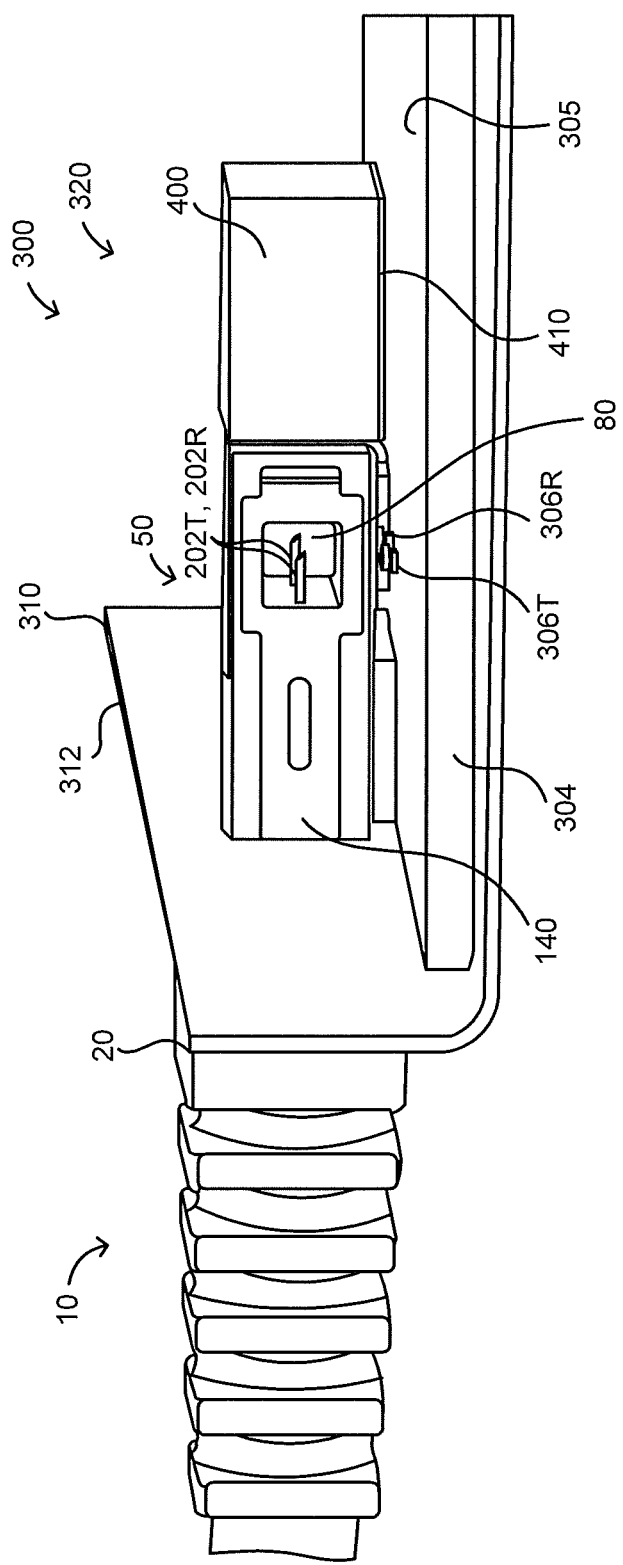
FIG. 10A is a side elevated view of the plug as matingly engaged with the receptacle, but with receptacle housing and electrical contacts removed so that the plug ferrule cavity is exposed.
Figure 10B:
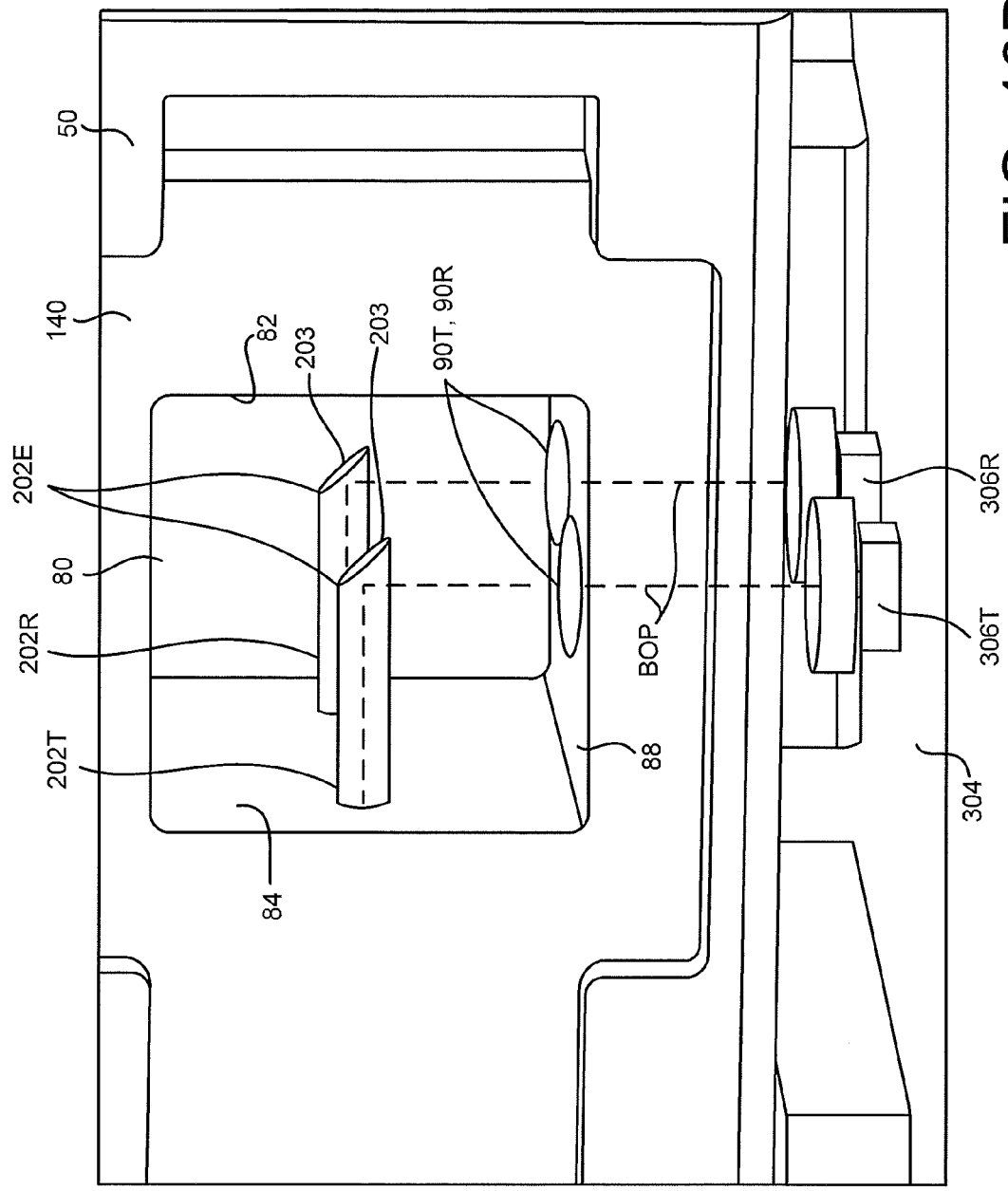
FIG. 10B is a close-up view similar to FIG. 10A but focuses on the plug ferrule cavity.
Figure 10C:
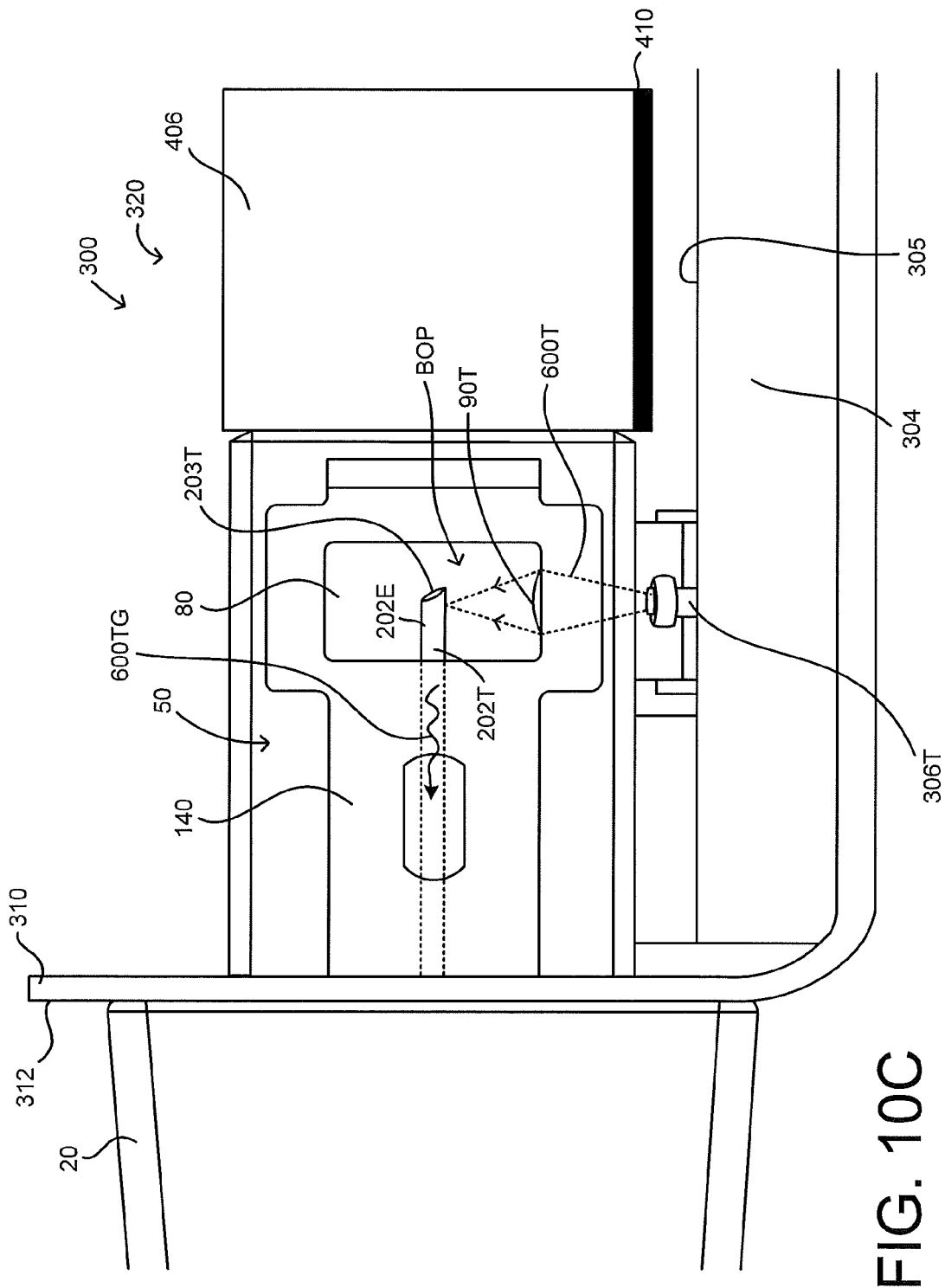
FIG. 10C is a close-up cut-away side view of the plug matingly engaged with the receptacle, including the plug electrical contacts but omitting the receptacle electrical contacts, and illustrates an example bent optical path for the transmit light.

FIG. 10A is a side elevated view of plug 10 matingly engaged with receptacle 320 but with receptacle housing 350 and electrical contacts 140 removed so that plug ferrule cavity 80 is exposed. FIG. 10B is a close-up view similar to FIG. 10A, but focused on the plug ferrule cavity 80. FIG. 10C is a close-up cut-away side view of plug 10 matingly engaged with receptacle 320, including plug electrical contacts 140, but omitting receptacle electrical contacts 240.

When plug 10 is fully matingly engaged with receptacle 320, such as shown in FIG. 9, plug ferrule cavity 80 resides in open mid-section aperture 361 so that end facets 203 of respective optical fiber ends 202E of transmit and receive optical fiber 202T and 202R and the transmit and receive lenses 90T and 90R are respectively aligned with optical transmitter 306T and optical receiver 306R.

Figure 10D:
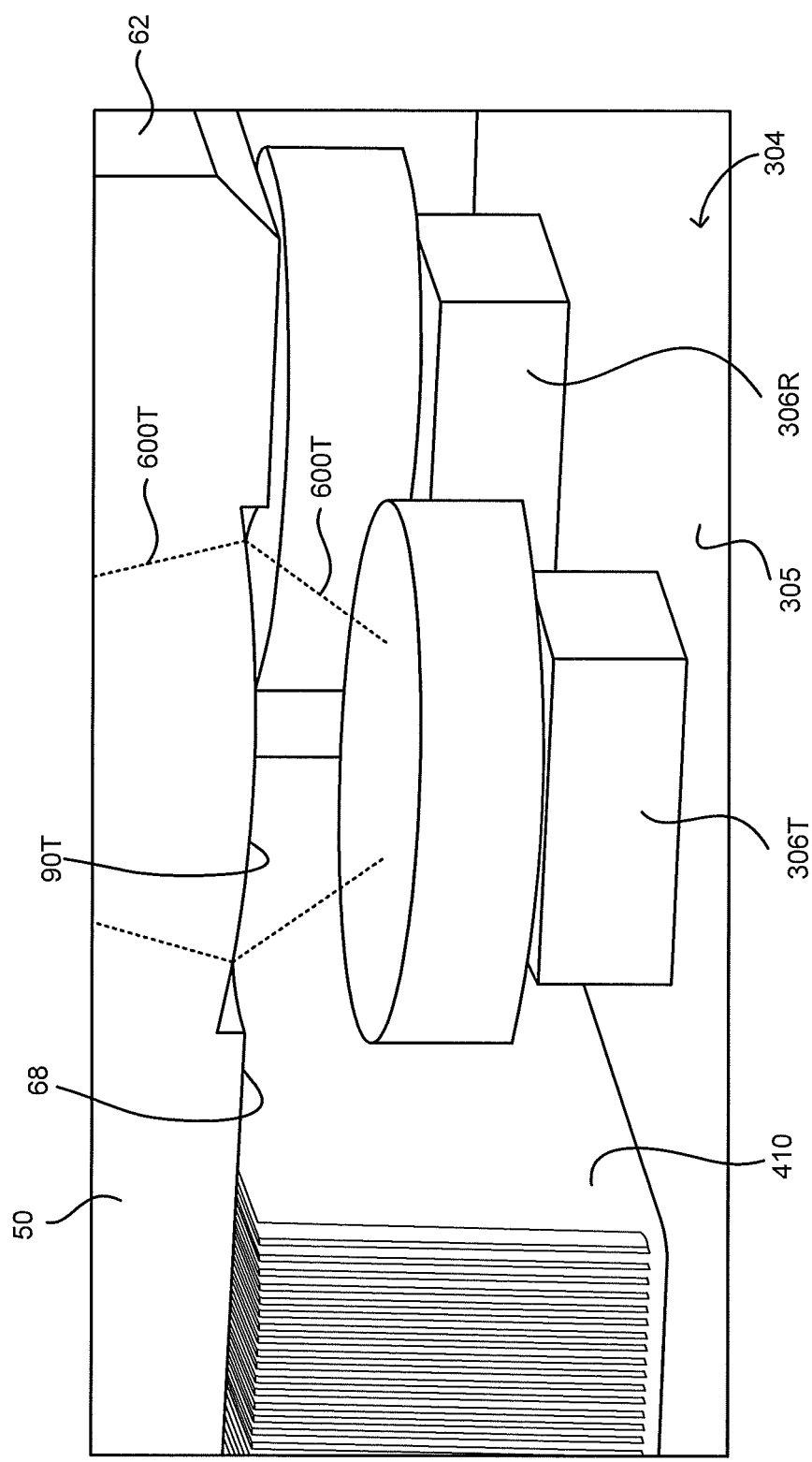
FIG. 10D is a close-up view of the transmit and receive lenses in the plug, with the lenses shown as being aligned with the optical transmitter and optical receiver when the plug is matingly engaged with the receptacle.

The respective alignment of lenses 90 with optical transmitter and optical receiver 306T and 306R is also shown in the close-up view of FIG. 10D. In this configuration, transmit light 600T can be emitted in the upward direction by optical transmitter 306T as a divergent beam, which is then received and focused by corresponding lens 90 (i.e., transmit lens 90T). Focused transmit light 600T from transmit lens 90T is then incident upon angled facet 203T of transmit optical fiber 202T (FIG. 10C), which bends the optical path of the transmit light substantially by a right angle so that the transmit light travels horizontally down the transmit optical fiber as guided transmit light 600TG. This forms bent optical path BOP. Transmit optical fiber 202T then carries the guided transmit light 600TG through plug 10 and into fiber optic cable 200.

Note that transmit lens 90T can be configured so that it receives divergent transmit light 600T from transmitter 306T over a first angular range (i.e., the transmitter numerical aperture, so to speak) and focuses this transmit light over a second angular range (i.e., the numerical aperture) of transmit optical fiber 202T. In an example, transmit lens 90T substantially collimates transmit light 600T within the body of the lens.

Figure 10E:
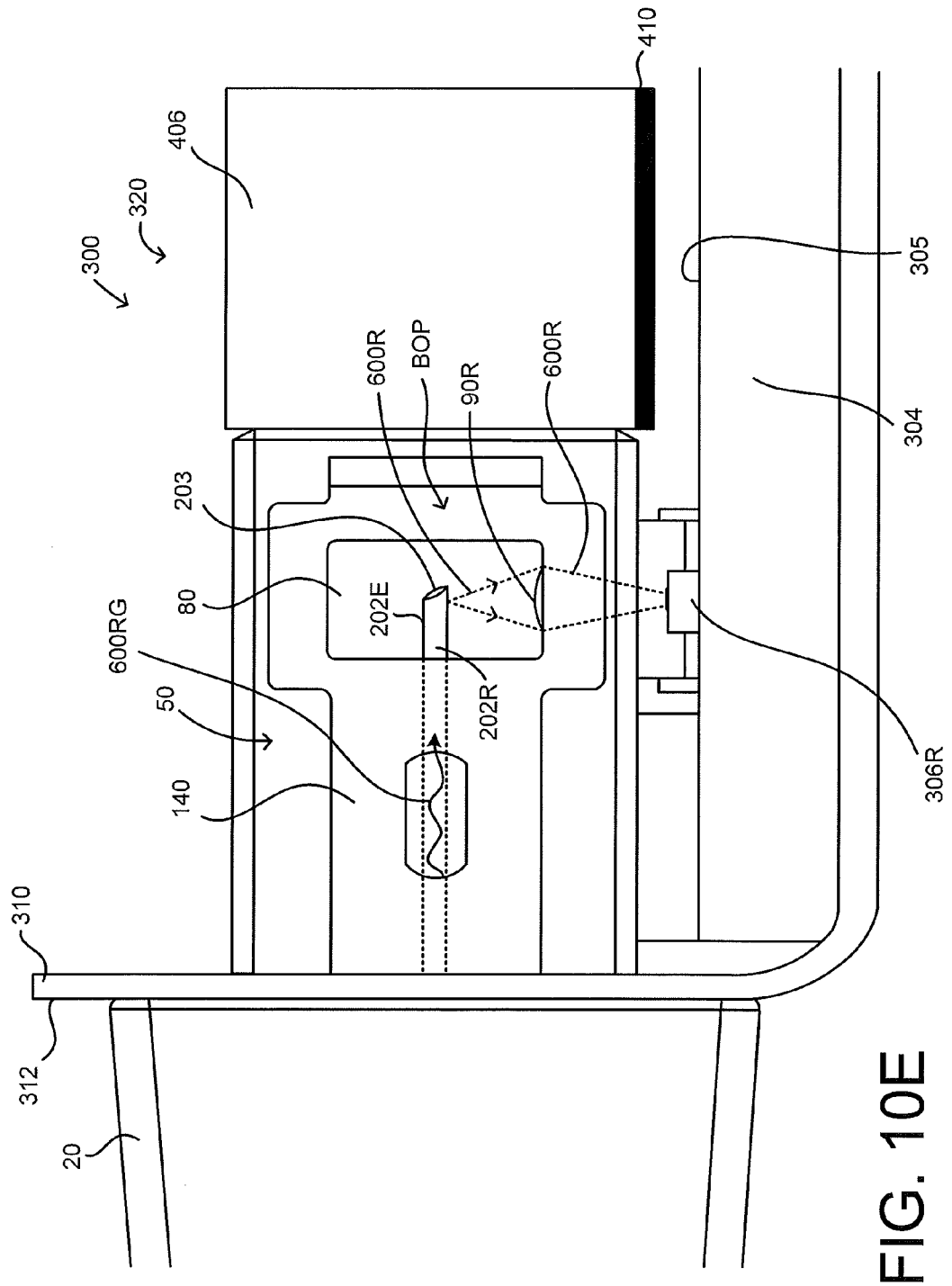
FIG. 10E is similar to FIG. 10C and illustrates an example bent optical path for the receive light.

Likewise, with reference to FIG. 10E, receive guided light 600RG traveling horizontally in receive optical fiber 202R encounters angled facet 203R, which bends the optical path of the receive guided light substantially by a right angle so that the receive guided light is emitted downward from the optical fiber as a divergent beam. This divergent receive light 600R is incident upon the corresponding lens 90 (i.e., receive lens 90R), which collimates and then focuses the receive light onto optical receiver 306R. Optical receiver 306R converts receive light 600R to electrical signals (not shown) that are then processed by components (not shown) on electronic device circuit board 304.

Receive lens 90T is configured so that it receives divergent receive light 600R from receive optical fiber 202R over a first angular range (i.e., the receive optical fiber numerical aperture) and focuses this receive light over a second angular range (i.e., the numerical aperture, so to speak) of receiver 306R. In an example, receive lens 90R substantially collimates receive light 600R within the body of the lens.

In each case, transmit light 600T and receive light 600R carries information embodied in optical signals.

Thus, in an example, transmit and receive optical fibers 202T and 202R and their respective end facets 203T and 203R defined respective bend optical paths for transmit light 600T and receive light 600R, with the respective transmit and receive lenses 90T and 90R being configured to provide optical communication between the transmit and receive optical fibers and the respective transmitter and receiver over the respective bent optical paths.

While the bent optical path BOP is shown as having a substantially right-angle bend due to the transmit and receive optical fiber end facets 203T and 203R having angles of about 45 degrees relative to the central axes of the transmit and receive optical fibers 202T and 202R, other bend angles can be used. For example, it may be that transmitter and receiver 306T and 306R can be configured so that they respectively emit transmit light 600T and detect receive light 600R at a central angle other than a right angle to circuit board planar surface 305. In this case, optical fiber end facets 203T and 203R can have an angle other than 45 degrees. In addition, optical fibers 202 may be bend-insensitive optical fibers, in which case the optical fibers need not have angled facets, but rather the fiber can be strongly bent so that the fiber ends 202E face downwards (i.e., the optical fibers have a substantially 90 degree bend), such as described above in connection with FIG. 2E.

Note that when plug 10 is in the process of being disengaged with (i.e., is removed from) receptacle 320, cleaning member 400 is urged axially forward by the compressed resilient member 450 and slides back into place within open mid-section 361 of receptacle housing 350. As it does so, cleaning element 420 passes over optical transmitter and optical receiver 306T and 306R, which serves to clean these components of any contaminants that may have accumulated. When cleaning member 400 is in its forward-biased position, it covers optical transmitter 306T and optical receiver 306R. This serves to keep optical transmitter 306T and optical receiver 306R clean when receptacle 320 is not in use.

In an example, cleaning member 400 can reside in front section 351 of receptacle housing 350, with cleaning member front end 402 residing at front-end aperture 372. This configuration serves to block front-end aperture 372 and close off interior 370 of the front section 351 of receptacle housing 350 from the outside of electronic device 300. This serves to prevent contaminants such as debris, dust, dirt, particles, liquids, etc. from entering receptacle 320, thereby maintaining the receptacle in a clean state when the receptacle is not in use. This configuration also obviates the need for using a separate cover, cap or insert for receptacle 320 to keep it clean when not in use.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A fiber optic interface device, comprising:
    a ferrule with a body having front and rear ends and an internal cavity adjacent the front end and defined by a rear wall and a bottom wall, the bottom wall having inner and outer surfaces, with at least one of the inner and outer surfaces being curved to define at least one lens, the body having at least one bore open to the cavity rear wall and the body rear wall; and
    at least one optical waveguide having an end and that defines a bent optical path within the cavity, the at least one optical waveguide supported by the at least one bore so that the bent optical path is aligned with the at least one lens.

2. The fiber optic interface device of claim 1, further comprising the optical fiber end having an angled facet that resides within the cavity, with the angle facet defining the bent optical path.

3. The fiber optic interface device according to claim 1, further comprising the at least one optical waveguide comprising first and second optical fibers, and the at least one lens comprising first and second lenses having at least one convex surface.

4. The fiber optic interface device according to claim 1, further comprising at least one electrical contact on at least one side of the ferrule body.

5. The fiber optic interface device according to claim 4, further comprising a fiber optic cable that supports the at least one waveguide and at least one electrical wire, with the electrical wire being electrically connected to the at least one electrical contact.

6. The fiber optic interface device according to claim 1, further comprising at least one of a keying feature and a latching feature.

7. A fiber optic interface assembly, comprising:
    (I) a fiber optic interface configured as a plug and comprising: (a) a ferrule with a body having front and rear ends and an internal cavity adjacent the front end and defined by a rear wall and a bottom wall, the bottom wall having inner and outer surfaces, with at least one of the inner and outer surfaces being curved to define at least one lens, the body having at least one bore open to the cavity rear wall and the body rear wall; and (b) at least one optical waveguide having an end and that defines a bent optical path within the cavity, the at least one optical waveguide supported by the at least one bore so that the bent optical path is aligned with the at least one lens; and
    (II) a second fiber optic interface device configured as a receptacle that receives and matingly engages with the plug, the receptacle having a front-end entrance aperture, a rear section, a central axis and a moveable cleaning element, wherein the moveable cleaning element is displaced when the plug and receptacle are matingly engaged.

8. The fiber optic interface assembly according to claim 7, further comprising:
    a circuit board that supports the receptacle and that operably supports an optical transmitter and an optical receiver in cooperative relationship with the receptacle so that the moveable cleaning element resides over and in contact with the optical transmitter and optical receiver when the plug and receptacle are not engaged and moves over and in contact with the optical transmitter and optical receiver when the plug enters and leaves the receptacle.

9. The fiber optic interface assembly according to claim 8, wherein the cleaning member includes a cleaning element that contacts the optical transmitter and optical receiver when the cleaning member resides over or moves over the optical transmitter and optical receiver.

10. The fiber optic interface assembly according to claim 8, wherein the cleaning element has a front end that blocks the receptacle entrance aperture when the plug is not engaged with the receptacle.

11. The fiber optic interface assembly according to claim 8, wherein the receptacle is defined by a receptacle housing, and the cleaning element is forward-biased by a resilient element cooperatively engaged with the cleaning element and the receptacle housing.

12. A receptacle fiber optic interface device ("receptacle") for matingly engaging with a plug fiber optic interface device ("plug"), comprising:
 a circuit board having a substantially planar surface and that operably supports an optical transmitter and an optical receiver that respectively emit transmit light and detect receive light in a direction substantially perpendicular to the substantially planar surface of the circuit board;
 a housing arranged relative to the circuit board and having a front-end aperture that leads to a housing interior, the front-end aperture and housing interior configured to received and engage the plug fiber optic interface device; and
 a moveable cleaning element supported in the housing interior in a forward-biased position over the optical transmitter and optical receiver, the moveable cleaning element configured to be displaced relative to the optical transmitter and optical transceiver when the plug matingly engages the receptacle.

13. The receptacle of claim 12, wherein the moveable cleaning element is configured to be axially displaced.

14. The receptacle of claim 12, further comprising:
 a resilient member cooperatively arranged with the movable cleaning element and the housing to forward-bias the cleaning member; and
 a cleaning element on a bottom surface of the cleaning member, the cleaning element contacting the optical transmitter and optical receiver in the forward-bias position and as the cleaning member moves relative to the optical transmitter and optical receiver.

15. The receptacle of claim 12, further comprising:
 the cleaning member having a front end and being supported in the housing interior such that the front end blocks the front-end aperture of the housing.

16. A receptacle fiber optic interface assembly, comprising:
 the receptacle of claim 12;
 the plug mated to the receptacle, the plug comprising transmit and receive optical fibers having respective faceted ends that define respective bent optical paths, the plug having transmit and receive lenses configured to provide optical communication between the transmit and receive optical fibers and the respective transmitter and receiver over the respective bent optical paths.

17. A fiber optic interface device, comprising:
 first and second optical fibers that respectively include first and second features that define respective first and second bent optical paths;
 a ferrule having a body with front and rear ends and a bottom surface, a central cavity and first and second bores that respectively support the first and second optical fibers so that the first and second features reside within the central cavity; and
 first and second lenses formed in the ferrule body and having first and second convex surfaces on the ferrule bottom surface, the first and second lenses being respectively operably aligned with the first and second bent optical paths.

18. The fiber optic interface device according to claim 17, further comprising the first and second features comprising at least one of an optical fiber bend and an angled facet.

19. The fiber optic interface device of claim 17, further comprising first and second electrical contacts on respective sides of the ferrule body.

20. The fiber optic interface device according to claim 19, further comprising a fiber optic cable that supports the first and second optical fibers and first and second electrical wires, the first and second electrical wires being respectively electrically connected to the first and second electrical contacts.

21. The fiber optic interface device according to claim 17, further comprising at least one of a keying feature and a latching feature.

22. A fiber optic interface assembly, comprising:
 the fiber optic interface device of claim 18;
 a receptacle configured to receive the fiber optic interface device, the receptacle supported by a circuit board having first and second active devices; and
 wherein the first and second lenses are configured to provide optical communication between the first and second optical fibers and the respective first and second active devices over the respective first and second bent optical paths.

23. The fiber optic interface assembly, comprising:
 (I) a fiber optic interface device, comprising:
 first and second optical fibers that respectively include first and second features that define respective first and second bent optical paths;
 a ferrule having a body with front and rear ends and a bottom surface, a central cavity and first and second bores that respectively support the first and second optical fibers so that the first and second features reside within the central cavity; and
 first and second lenses formed in the ferrule body and having first and second convex surfaces on the ferrule bottom surface, the first and second lenses being respectively operably aligned with the first and second bent optical paths, the first and second features comprising at least one of an optical fiber bend and an angled facet; and
 (II) a receptacle configured to receive the fiber optic interface device, the receptacle supported by a circuit board having first and second active devices; and
 wherein the first and second lenses are configured to provide optical communication between the first and second optical fibers and the respective first and second active devices over the respective first and second bent optical paths, the receptacle containing a moveable cleaning member that moves across and contacts the first and second active devices when the fiber optic interface device moves within the receptacle.

24. A fiber optic interface assembly, comprising:
 (I) a fiber optic interface configured as a plug and comprising: (a) a ferrule with a body having front and rear ends and an internal cavity adjacent the front end and defined by a rear wall and a bottom wall, the bottom wall having inner and outer surfaces, with at least one of the inner and outer surfaces being curved to define at least one lens, the body having at least one bore open to the cavity rear wall and the body rear wall;
 (II) a second fiber optic interface device configured as a receptacle that receives and matingly engages with the plug, the receptacle having a front-end entrance aperture, a rear section, a central axis and a moveable cleaning element, wherein the moveable cleaning element is displaced when the plug and receptacle are matingly engaged.

\* \* \* \* \*